(12) United States Patent
Jeon et al.

(10) Patent No.: US 10,830,493 B2
(45) Date of Patent: Nov. 10, 2020

(54) INDUCTION HEATING MODULE AND WATER PURIFIER HAVING THE SAME

(71) Applicant: LG ELECTRONICS INC., Seoul (KR)

(72) Inventors: Jewook Jeon, Seoul (KR); Kobong Choi, Seoul (KR); Yonghyun Kim, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/270,014

(22) Filed: Feb. 7, 2019

(65) Prior Publication Data

US 2019/0170395 A1 Jun. 6, 2019

Related U.S. Application Data

(62) Division of application No. 15/473,739, filed on Mar. 30, 2017, now Pat. No. 10,267,535.

(30) Foreign Application Priority Data

May 4, 2016 (KR) .................. 10-2016-0055539

(51) Int. Cl.
*F24H 1/18* (2006.01)
*C02F 1/00* (2006.01)
(Continued)

(52) U.S. Cl.
CPC ............. *F24H 1/185* (2013.01); *B01D 15/00* (2013.01); *B01D 29/56* (2013.01);
(Continued)

(58) Field of Classification Search
CPC ........... F24H 1/85; H05B 1/0244; H05B 6/02; H05B 6/06; C02F 2307/10
See application file for complete search history.

(56) References Cited

U.S. PATENT DOCUMENTS 3,936,625 A * 2/1976 Burnett .................. F24D 7/00
219/630
5,293,446 A * 3/1994 Owens .................. F24H 1/202
122/14.21
(Continued)

FOREIGN PATENT DOCUMENTS

CN 1790210 6/2006
CN 201271147 7/2009
(Continued)

OTHER PUBLICATIONS

Chinese Office Action in Chinese Application No. 201710303838.1, dated Mar. 21, 2019, 17 pages (with English translation).
(Continued)

*Primary Examiner* — J C Jacyna
(74) *Attorney, Agent, or Firm* — Fish & Richardson P.C.

(57) ABSTRACT

A water purifier includes a hot water tank for receiving and heating received water by induction heating, a water outlet portion that is at least partially exposed to an outside of the water purifier for discharging hot water, a hot water line that is connected to the water outlet portion to communicate the hot water from the hot water tank to the water outlet portion, a hot water outlet valve that is located at the hot water line and that opens or closes the hot water line based on a control command, a connector that includes a hot water inlet connected to a water outlet pipe of the hot water tank and a hot water outlet connected to the hot water line, and a temperature sensor that is connected to the connector and that is configured to measure a temperature of the hot water that passes through the connector.

20 Claims, 6 Drawing Sheets

US 10,830,493 B2
Page 2

(51) Int. Cl.

| | | |
|---|---|---|
| B01D 61/18 | (2006.01) | |
| B01D 61/22 | (2006.01) | |
| B67D 1/16 | (2006.01) | |
| H05B 6/10 | (2006.01) | |
| B01D 15/00 | (2006.01) | |
| B01D 29/56 | (2006.01) | |
| B01D 35/147 | (2006.01) | |
| B01D 61/14 | (2006.01) | |
| B67D 1/00 | (2006.01) | |
| B67D 1/08 | (2006.01) | |
| B67D 1/12 | (2006.01) | |
| F25D 23/00 | (2006.01) | |
| F25D 31/00 | (2006.01) | |
| H05B 1/02 | (2006.01) | |
| H05B 6/02 | (2006.01) | |
| C02F 1/28 | (2006.01) | |
| C02F 1/44 | (2006.01) | |

(52) U.S. Cl.
CPC ....... *B01D 35/1475* (2013.01); *B01D 61/145* (2013.01); *B01D 61/18* (2013.01); *B01D 61/22* (2013.01); *B67D 1/0004* (2013.01); *B67D 1/0014* (2013.01); *B67D 1/0859* (2013.01); *B67D 1/0895* (2013.01); *B67D 1/125* (2013.01); *B67D 1/16* (2013.01); *C02F 1/003* (2013.01); *F25D 23/003* (2013.01); *F25D 31/003* (2013.01); *H05B 1/0244* (2013.01); *H05B 6/02* (2013.01); *H05B 6/108* (2013.01); *B01D 2313/22* (2013.01); *B01D 2313/50* (2013.01); *B67D 2001/0093* (2013.01); *B67D 2210/0001* (2013.01); *B67D 2210/00031* (2013.01); *B67D 2210/00102* (2013.01); *B67D 2210/00118* (2013.01); *C02F 1/283* (2013.01); *C02F 1/444* (2013.01); *C02F 2209/02* (2013.01); *C02F 2209/40* (2013.01); *C02F 2307/10* (2013.01)

(56) References Cited

U.S. PATENT DOCUMENTS

| | | | | |
|---|---|---|---|---|
| 5,692,096 A * | 11/1997 | Massey | .................. | A47J 31/56 392/451 |
| 8,636,174 B1 * | 1/2014 | Motkowski | .......... | B67D 1/1295 222/1 |
| 10,267,535 B2 * | 4/2019 | Jeon | ....................... | B01D 15/00 |
| 2003/0080115 A1 * | 5/2003 | Zhang | ................... | H05B 6/108 219/629 |
| 2009/0007975 A1 * | 1/2009 | Lum | ....................... | E03B 1/048 137/597 |
| 2009/0260583 A1 * | 10/2009 | Choi | ....................... | F24H 1/181 122/19.2 |
| 2009/0293967 A1 * | 12/2009 | Frolich Braathen | .... | F24H 9/126 137/605 |
| 2013/0105513 A1 * | 5/2013 | Krause | ................. | B67D 1/0858 222/69 |
| 2014/0374444 A1 * | 12/2014 | Forte | .................... | B67D 3/0022 222/144.5 |
| 2016/0138829 A1 * | 5/2016 | Park | .......................... | F24H 1/18 122/14.1 |
| 2016/0187027 A1 * | 6/2016 | Gaspard | ................ | F24H 1/201 122/14.3 |
| 2016/0213193 A1 * | 7/2016 | Liu | .......................... | A47J 31/54 |
| 2017/0003153 A1 * | 1/2017 | Ward | ................... | F24D 19/1051 |
| 2017/0050835 A1 * | 2/2017 | Moon | .................. | B67D 1/0895 |
| 2017/0145669 A1 * | 5/2017 | Klicpera | ................... | E03C 1/00 |
| 2017/0153056 A1 * | 6/2017 | Kim | ......................... | B01D 1/28 |
| 2017/0369298 A1 * | 12/2017 | Walton | ................. | B67D 1/0067 |
| 2018/0163992 A1 * | 6/2018 | Butler | .................. | F24H 9/1818 |
| 2018/0238587 A1 * | 8/2018 | Roddy | ................. | F24H 9/2007 |

FOREIGN PATENT DOCUMENTS

| | | | |
|---|---|---|---|
| CN | 201652876 | | 11/2010 |
| CN | 102136461 | | 7/2011 |
| CN | 202005629 | | 10/2011 |
| CN | 203168879 | | 9/2013 |
| CN | 204378898 | | 6/2015 |
| CN | 104840101 | | 8/2015 |
| CN | 204626874 | | 9/2015 |
| CN | 204839176 | | 12/2015 |
| CN | 204944059 | | 1/2016 |
| CN | 105507442 | | 4/2016 |
| JP | 59106777 | * | 6/1984 ......... G05D 23/1346 |

OTHER PUBLICATIONS

Chinese Office Action in Chinese Appln. No. 201710303838.1, dated Mar. 21, 2019, 17 pages (with English translation).
Chinese Office Action in Chinese Application No. 201710303838.1, dated Sep. 24, 2019, 17 pages (with English translation).
Chinese Office Action in Chinese Appln. No. 201710303838.1, dated Apr. 17, 2020, 21 pages (with English translation).

* cited by examiner

INDUCTION HEATING MODULE AND WATER PURIFIER HAVING THE SAME

CROSS-REFERENCE TO RELATED APPLICATIONS

This application is a division of Ser. No. 15/473,739, filed on Mar. 30, 2017, now allowed, which claims the benefit of earlier filing date and right of priority to Korean Application No. 10-2016-0055539, filed on May 4, 2016, the contents of which are incorporated by reference herein in their entirety.

FIELD

The present disclosure relates to a water purifier that can generate hot water using an induction heating method.

BACKGROUND

A water purifier is an apparatus that can filter out various hazardous ingredients harmful to human body contained in raw water such as tap water, underground water, or the like by several stages of filters installed within a main body to convert it to safe and sanitary drinking water.

A water purifier may provide hot water and cold water in addition to room temperature water. A water purifier for providing hot water and cold water is additionally provided therein with a heating device and a cooling device. A tankless type water purifier that provides hot water, cold water, or purified water requires to heat or cool water within a short period of time. Induction heating is a heating method that heats a metal object by electromagnetic induction. When a current is supplied to a coil, an eddy current is generated on the metal object. The eddy current flows through the metal object with a resistance and generates heat by Joule heating.

Induction heating may be controlled by a control system based on electrical signals for a rapid and precise temperature control. A rapid and precise temperature control system may require a temperature information of hot water measured by a temperature sensor.

SUMMARY

According to one aspect of the subject matter described in this application, a water purifier includes: a hot water tank that is configured to receive water and that is configured to heat the received water by induction heating; a water outlet portion that is at least partially exposed to an outside of the water purifier and that is configured to discharge hot water that has been heated in the hot water tank; a hot water line that is connected to the water outlet portion and that defines a water outlet passage that communicates the hot water from the hot water tank to the water outlet portion; a hot water outlet valve that is located at the hot water line and that is configured to open or close the hot water line based on a control command; a connector that includes a hot water inlet connected to a water outlet pipe of the hot water tank and that includes a hot water outlet connected to the hot water line; and a temperature sensor that is connected to the connector and that is configured to measure a temperature of the hot water that passes through the connector.

Implementations according to this aspect may include one or more of the following features. The connector may be located nearer to the hot water tank than to the hot water outlet valve. The connector may be located between the hot water outlet valve and the hot water tank. A distance between the connector and the water outlet pipe of the hot water tank may be less than 200 mm. The connector may define a hole that is configured to receive the temperature sensor, and an end portion of the temperature sensor may be passed through the hole and exposed to the hot water. The temperature sensor may have a first portion that has a first cross section that is smaller than a size of the hole, that is configured to be inserted into the hole, and that is configured to be exposed to the hot water passing through the connector. In addition, the temperature sensor may have a second portion that is stepped out radially from the first portion and that has a cross section that is larger than the size of the hole. A stepped portion of the second portion may contact an upper surface of the connector around the hole.

In some implementations, the connector may define a temperature sensor support portion that is protruded from a circumference of the hole, and the temperature sensor support portion may be configured to receive the temperature sensor. The connector may further include an O-ring that surrounds the temperature sensor and that is configured to restrict a leak of the hot water between the temperature sensor and the temperature sensor support portion.

The water purifier may further include a connecting portion that is configured to receive the connector and that is configured to fix the connector to the water purifier. The connecting portion may include a base that defines a first hole that is configured to receive a screw shaft configured to fasten the connector to the connecting portion, and a second hole that is configured to receive at least a part of the temperature sensor. The connector may further include a safety outlet that is located at the connector, that is branched from the water outlet passage, and that is located between the hot water inlet and the hot water outlet. The water purifier may further include a drain that defines a drainage passage to an outside of the water purifier, a safety line that is connected to the safety outlet and the drain, and a safety valve that is located at the safety line and that is configured to open based on a pressure in a water passage of the water purifier increasing above a safety reference pressure. The safety outlet may be located between the temperature sensor and the hot water inlet. The induction heating may be configured to be controlled based on the temperature of the hot water measured by the temperature sensor. The hot water inlet may have a stepped portion inside the connector, and the hot water outlet may have a stepped portion inside the connector.

According to another aspect, a water purifier includes: a hot water tank that is configured to receive a water and that is configured to heat the water by an induction heating; a water outlet portion that is exposed to an outside of the water purifier and that is configured to discharge a hot water heated from the hot water tank; a hot water line that is connected to the water outlet portion and that defines a water outlet passage that communicates the hot water from the hot water tank to the water outlet portion; a hot water outlet valve that is located at the hot water line and that is configured to open or close the hot water line based on a control command; a safety valve that is configured to be open based on a pressure in a water passage of the water purifier increasing above a safety reference pressure; and a connector that includes a hot water inlet that is connected to a water outlet pipe of the hot water tank, a hot water outlet that is connected to the hot water line, and a safety outlet that is connected to the safety valve.

According to another aspect of the subject matter described in this application, a water purifier includes: a hot water tank that is configured to receive a water and that is configured to heat the water by an induction heating; a water outlet portion that is exposed to an outside of the water purifier and that is configured to discharge a hot water heated from the hot water tank; a hot water line that is connected to the water outlet portion and that defines a water outlet passage that communicates the hot water from the hot water tank to the water outlet portion; a hot water valve that is located at the hot water line and that is configured to open or close the hot water line based on a control command; a temperature sensor that is configured to measure a water temperature between the hot water tank and the water outlet portion; a safety valve that is configured to open based on a pressure in a water passage of the water purifier increasing above a safety reference pressure; and a connector that includes a hot water inlet that is connected to a water outlet pipe of the hot water tank, a hot water outlet that is connected to the hot water line, a hole that is configured to receive a temperature sensor, and a safety outlet that is connected to the safety valve.

DETAILED DESCRIPTION

Figure 1:
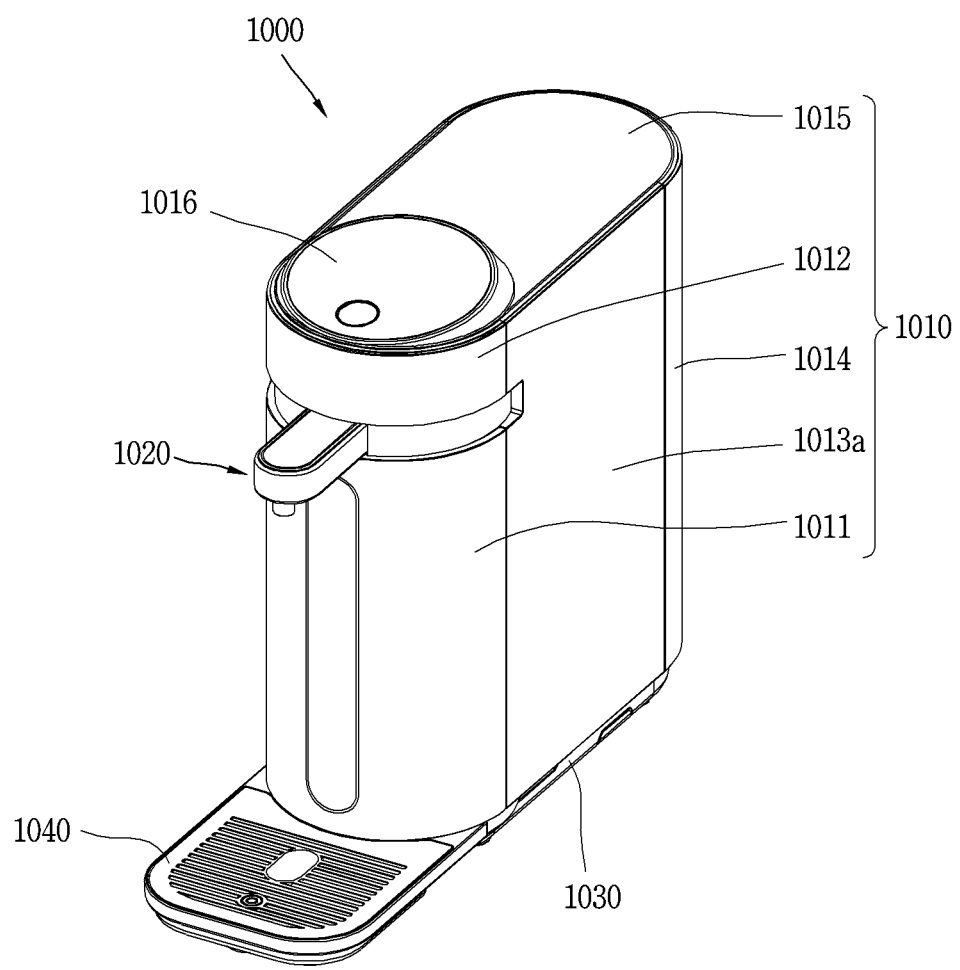
FIG. 1 is a perspective view showing an outer appearance of an example water purifier.

FIG. 1 illustrates an example water purifier 1000. The water purifier 1000 may include a cover 1010, a water outlet portion 1020, a base assembly 1030, and a tray 1040.

The cover 1010 forms an outer appearance of the water purifier 1000. An outer appearance of the water purifier 1000 may be referred to as a body of the water purifier 1000. Components for filtering raw water are provided within the cover 1010. The cover 1010 covers the inside components to protect them, for example, from damage. The term cover 1010 may be replaced with a case or housing in the following description. The cover 1010 may be made from a single component or a combination of several components. For example, as illustrated in FIG. 1, the cover 1010 may include a front cover 1011, a rear cover 1014, a side panel 1013a, an upper cover 1012, and a top cover 1015.

The front cover 1011 is disposed at a front side of the water purifier 1000. The rear cover 1014 is disposed at a rear side of the water purifier 1000. The front side and rear side of the water purifier 1000 are set based on a direction of the water outlet portion 1020 facing a user. However, the definition of the front side and rear side of the water purifier 1000 may vary in some implementations.

The side panels 1013a are disposed on the left and the right of the water purifier 1000. The side panel 1013a is disposed between the front cover 1011 and the rear cover 1014. The side panel 1013a may be coupled to the front cover 1011 and rear cover 1014. The side panel 1013a covers most area of a side surface of the water purifier 1000.

The upper cover 1012 is disposed at a front side of the water purifier 1000. The upper cover 1012 is provided above the front cover 1011. The water outlet portion 1020 is exposed in a space between the upper cover 1012 and the front cover 1011. The upper cover 1012 forms an outer appearance of a front surface of the water purifier 1000 along with the front cover 1011.

The top cover 1015 forms an upper surface of the water purifier 1000. An input/output portion 1016 may be formed at a front side of the top cover 1015. The input/output portion 1016 has an user input portion and an output display portion. The user input portion is configured to receive control commands from a user. A method of receiving user's control commands at the user input portion may include a touch, a physical press, or the like. The output display portion is configured to provide the status information of the water purifier 1000 to the user in an audio-visual manner.

The water outlet portion (or cork assembly) 1020 provides purified water to a user according to the user's control command. At least a part of the water outlet portion 1020 is exposed to an outside of the body of the water purifier 1000 to supply water. In some implementations, the water purifier 1000 may be configured to provide cold water at a temperature lower than the ambient temperature, hot water at a temperature higher than the ambient temperature, or both. Hot water, cold water, and purified water at the ambient temperature may be discharged through the water outlet portion 1020 according to a control command applied from a user.

The water outlet portion 1020 may be configured to rotate according to a user's manipulation. The front cover 1011 and the upper cover 1012 may include a rotation region of the water outlet portion 1020, and the water outlet portion 1020 may be rotated in the left and right directions in the rotation region. The rotation of the water outlet portion 1020 may be carried out by a force physically applied to the water outlet portion 1020 by the user. The rotation of the water outlet portion 1020 may be carried out based on a control command applied to the input/output portion 1016 by the user. A structure that enables the rotation of the water outlet portion 1020 may be located within the water purifier 1000 and covered by the upper cover 1012. The input/output portion 1016 may also rotate along with the water outlet portion 1020 during the rotation of the water outlet portion 1020.

The base 1030 forms a bottom of the water purifier 1000. Components within the water purifier 1000 are supported by the base 1030. When the water purifier 1000 may be mounted on a floor, a shelf or the like, the base 1030 faces down. Accordingly, when the water purifier 1000 is mounted on the floor, the bottom or the like, the structure of the base 1030 is not exposed to an outside.

The tray 1040 is disposed to face the water outlet portion 1020. As illustrated in FIG. 1, the tray 1040 may support a container or the like that receives purified water from the water outlet portion 1020. Furthermore, the tray 1040 is formed to accommodate residual water falling from the water outlet portion 1020. When the tray 1040 receives and collects residual water falling from the water outlet portion 1020, it may be possible to limit or prevent a spill of the residual water around the water purifier 1000.

The tray 1040 may also rotate along with the water outlet portion 1020 to receive the residual water falling from the water outlet portion 1020. The input/output portion 1016 and tray 1040 may rotate in the same direction as that of the water outlet portion 1020.

Figure 2:
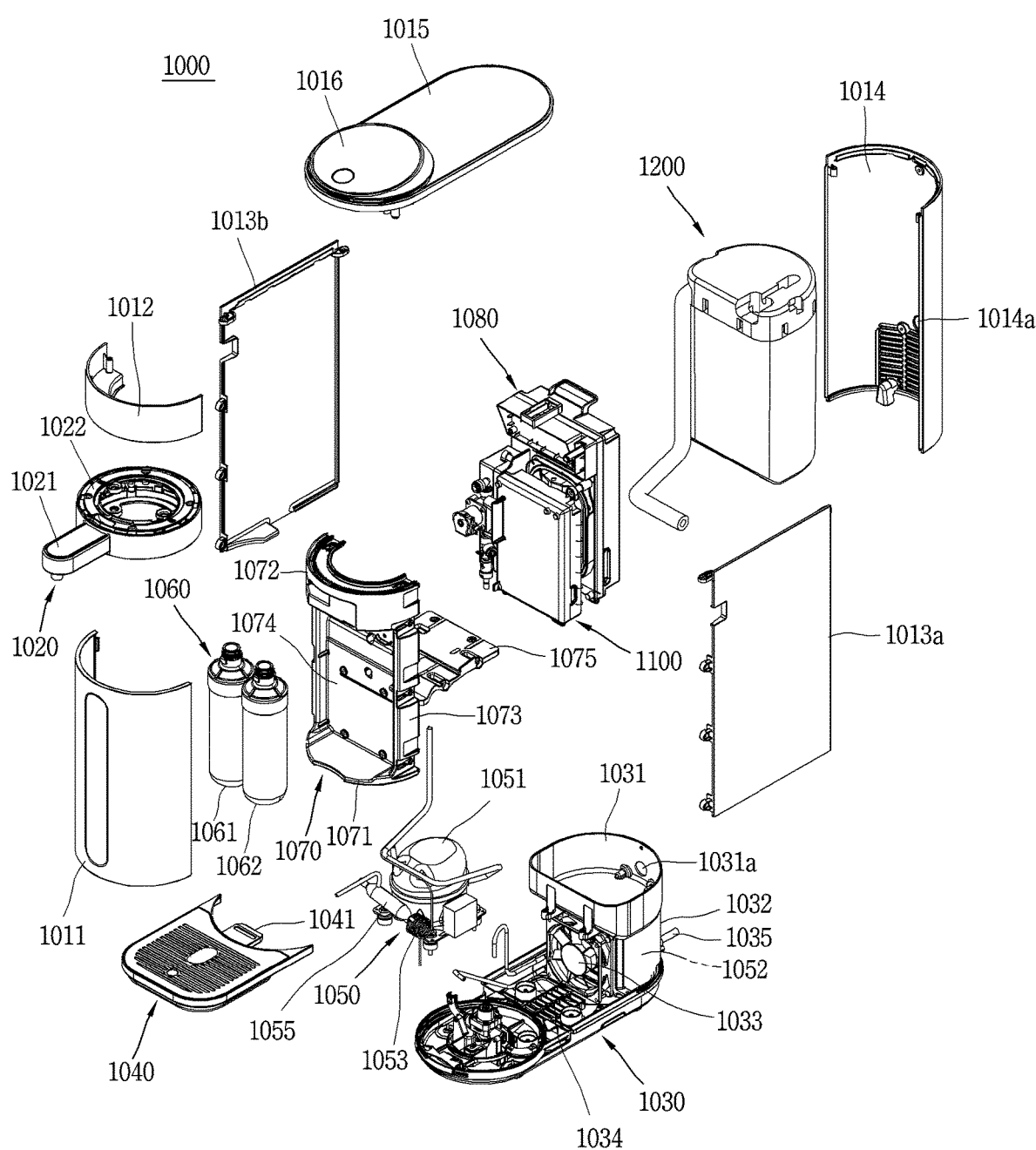
FIG. 2 is an exploded perspective view showing an example internal configuration of the water purifier.

FIG. 2 illustrates an internal configuration of an example water purifier 1000 illustrated in FIG. 1.

A filter portion 1060 is installed at an inside of the front cover 1011. The filter portion 1060 is configured to filter raw water supplied from a raw water supply unit to generate purified water. Because purifying water is difficult using only one filter, the filter portion 1060 may include a plurality of unit filters 1061, 1062. The unit filters 1061, 1062 may include a prefilter such as carbon black, absorption filter or the like, and a high-performance filter such as a high efficiency particulate air (HEPA) filter, UF (ultra filtration) filter, or the like. In FIG. 2, two unit filters 1061, 1062 are installed, but the number of the unit filters 1061, 1062 may be increased or decreased as needed.

A plurality of unit filters 1061, 1062 are connected in a preset order. The preset order denotes an appropriate order for filtering water. Raw water may include various foreign substances. Large-sized particles such as hairs or dust may cause the filtration performance deterioration of the high-performance filters such as a HEPA filter or UF filter, and thus the high-performance filters should be protected from large-sized particles such as hairs or dust may. Accordingly, a prefilter may be installed at an upstream side of the high performance filters.

The prefilter is configured to remove large-sized particles from water. When the prefilter is disposed at an upstream side of the high-performance filters to first remove large-sized particles contained in raw water, water that does not contain large-sized particles may be supplied to the ultra filtration filter to protect the ultra filtration filter. The raw water that has passed through the prefilter is subsequently filtered by the HEPA filter, UF filter, or the like.

The purified water produced by the filter portion 1060 may be provided to a user through the water outlet portion 1020 without being heated or cooled. In some implementations, the temperature of purified water provided to the user corresponds to the ambient temperature. In some implementations, the purified water produced by the filter portion 1060 may heated by the induction heating module 1100 and cooled by the cold water tank assembly 1200.

A filter bracket assembly 1070 is a structure for fixing the unit filters 1061, 1062 of the filter portion 1060, and components such as a water outlet passage, a valve, a sensor, or the like.

A lower portion 1071 of the filter bracket assembly 1070 is coupled to the tray 1040. The lower portion 1071 of the filter bracket assembly 1070 is formed to accommodate a protrusion coupling portion 1041 of the tray 1040. As the protrusion coupling portion 1041 of the tray 1040 is inserted into the lower portion 1071 of the filter bracket assembly 1070, a coupling between the filter bracket assembly 1070 and the tray 1040 is carried out.

The lower portion 1071 of the filter bracket assembly 1070 and the tray 1040 have a curved surface corresponding to each other. The lower portion 1071 of the filter bracket assembly 1070 may be independently rotated from the remaining portion of the filter bracket assembly 1070.

An upper portion 1072 of the filter bracket assembly 1070 is configured to support the water outlet portion 1020. The upper portion 1072 of the filter bracket assembly 1070 forms a rotation path of the water outlet portion 1020. The water outlet portion 1020 may be divided into an outlet cork portion 1021 protruded to an outside of the water purifier 1000 and a rotation portion 1022 disposed within the water purifier 1000. The rotation portion 1022 may be formed in a circular shape as illustrated in FIG. 2. The rotation portion 1022 is mounted on the upper portion 1072 of the filter bracket assembly 1070. The water outlet portion 1020 mounted on the upper portion 1072 of the filter bracket assembly 1070 is configured to relatively rotate with respect to the filter bracket assembly 1070.

The lower portion 1071 and upper portion 1072 of the filter bracket assembly 1070 may be connected to each other by a top-down connecting portion 1073. The lower portion 1071 and upper portion 1072 of the filter bracket assembly 1070 connected to each other by top-down connecting portion 1073 may be rotated together in the same direction. If a user rotates the water outlet portion 1020, the upper portion 1072, top-down connecting portion 1073, lower portion 1071 and tray 1040 of the filter bracket assembly 1070 may be rotated along with the water outlet portion 1020.

A filter installation region 1074 configured to receive the unit filters 1061, 1062 of the filter portion 1060 may be formed between the lower portion 1071 and upper portion 1072 of the filter bracket assembly 1070. The filter installation region 1074 provides an installation space of the unit filters 1061, 1062.

A support fixture 1075 protruded toward a rear side of the water purifier 1000 is formed at an opposite side to the filter installation region 1074. The support fixture 1075 is configured to support the control module 1080 and induction heating module 1100. The control module 1080 and induction heating module 1100 are mounted on the support fixture 1075. The support fixture 1075 is disposed between the induction heating module 1100 and the compressor 1051 to block heat formed from the induction heating module 1100 from being conducted to a compressor 1051 or the like.

The control module 1080 is configured to implement the overall control of the water purifier 1000. Various printed circuit boards for controlling the operation of the water purifier 1000 may be integrated into the control module 1080.

The induction heating module 1100 is formed to heat purified water produced from the filter portion 1060 to produce hot water. The induction heating module 1100 may include components capable of heating purified water with an induction heating method. The induction heating module 1100 receives purified water from the filter portion 1060, and hot water produced from the induction heating module 1100 is discharged through the water outlet portion 1020.

The induction heating module may include a printed circuit board for controlling hot water production. A protection cover 1161 for protecting water from being infiltrated into the printed circuit board and protecting the printed circuit board in the event of fire may be coupled to one side of the induction heating module.

The refrigerating cycle device 1050 may be provided to produce cold water. The refrigerating cycle device 1050 indicates a set of devices in which the processes of compression-condensation-expansion-evaporation of refrigerant are consecutively carried out. In order to produce cold water from the cold water tank assembly 1200, the refrigerating cycle device 1050 may be first operated to make cooling water filled within the cold water tank assembly 1200 to be at low temperatures.

The refrigerating cycle device 1050 may include a compressor 1051, a condenser 1052, a capillary 1053, an evaporator disposed at an inside of the cold water tank assembly, a dryer 1055 and a refrigerant passage connecting them to each other. The refrigerant passage may include a pipe or the like that connects the compressor 1051, the condenser 1052, the capillary 1053, and the evaporator to each other to form a circulation passage of refrigerant.

The compressor 1051 is configured to compress refrigerant. The compressor 1051 is connected to a condenser 1052 by a refrigerant passage, and refrigerant compressed in the compressor flows to the condenser 1052 through the refrigerant passage. The compressor 1051 may be disposed below the support fixture 1075, and installed to be supported by the base 1030.

The condenser 1052 is configured to condense refrigerant. The refrigerant compressed in the compressor 1051 flows into the condenser 1052 through the refrigerant passage, and is condensed by the condenser 1052. The refrigerant condensed by the condenser 1052 flows into a dryer 1055 through the refrigerant passage.

The dryer 1055 is configured to remove moisture from refrigerant. In order to enhance the efficiency of the refrigerating cycle device 1050, moisture should be removed in advance from refrigerant introduced into a capillary 1053. The dryer 1055 is installed between the condenser 1052 and capillary 1053 to remove moisture from refrigerant, thereby enhancing the efficiency of the refrigerating cycle device 1050.

The expansion of refrigerant is implemented by the capillary 1053. The capillary 1053 is configured to expand refrigerant, and according to the design, a throttle valve or the like may constitute an expansion device instead of the capillary 1053. The capillary 1053 may be rolled in a coil-like shape to secure a sufficient length within a small space.

The evaporator is configured to evaporate refrigerant, and installed at an inner side of the cold water tank assembly 1200. Cooling water filled at an inner side of the cold water tank assembly 1200 and refrigerant in the refrigerating cycle device 1050 exchange heat with each other by the evaporator, and the cooling water may be maintained at low temperatures by heat exchange. Furthermore, purified water may be cooled by the cooling water maintained at low temperatures.

The refrigerant heated by exchanging heat with the cooling water in the evaporator is restored again to the compressor 1051 along the refrigerant passage to continuously circulate the refrigerating cycle device 1050.

The base 1030 is formed to support the compressor 1051, front cover 1011, rear cover 1014, two side panels 1013a, 1013b, filter bracket assembly 1070, condenser 1052, fan 1033, and the like. The base 1030 may preferably have a high rigidity to support the constituent elements.

The condenser 1052 and fan 1033 may be installed at a rear side of the water purifier 1000, and the circulation of air is continuously required for the dissipation of the condenser 1052. An intake port 1034 may be formed at the floor of the base 1030 to circulate air. Air inhaled through the intake port 1034 flows by the fan 1033. Air implements the cooling of the air cooling method while flowing toward the condenser 1052. A duct structure 1032 for surrounding the fan 1033 and condenser 1052 may be fixed to the base 1030 to enhance the dissipation efficiency of the condenser 1052.

A drain 1035 is installed at a rear side of the duct structure 1032. The drain 1035 is exposed to an outer side of the water purifier 1000 to form a drain passage. The internal passages of the water purifier 1000 are configured to pass through all the components, fluids existing in the internal passages may be all exhausted through the drain 1035 even if the drain 1035 is connected to any one internal passage.

A stand 1031 for supporting the cold water tank assembly 1200 may be installed at an upper portion of the condenser 1052. The stand 1031 is provided with a first hole 1031a at a rear side and the rear cover 1014 is provided with a second hole 1014a. The first hole 1031a and the second hole 1014a are formed at the corresponding positions to each other. The first hole 1031a and the second hole 1014a are provided to dispose the drain valve 1280 illustrated in FIG. 3 for the drainage of cooling water filled in the cold water tank assembly 1200.

The cold water tank assembly 1200 is formed to receive cooling water within the cold water tank assembly 1200. The cold water tank assembly 1200 receives purified water produced from the filter portion 1060. In some implementations of the tankless type water purifier, the cold water tank assembly 1200 may directly receive purified water from the filter portion 1060.

The temperature of cooling water filled in the cold water tank assembly 1200 may be decreased by the operation of the refrigerating cycle device 1050. The cold water tank assembly 1200 is configured to cool purified water with cooling water to form cold water.

Since the cooling water is stored in the cold water tank assembly 1200 but not circulated, the contamination level of the cooling water is increased when a long period of time has passed. For sanitary reasons, cooling water stored in the cold water tank assembly 1200 should be periodically discharged to an outside, and new cooling water should be filled into the cold water tank assembly 1200.

Figure 3:
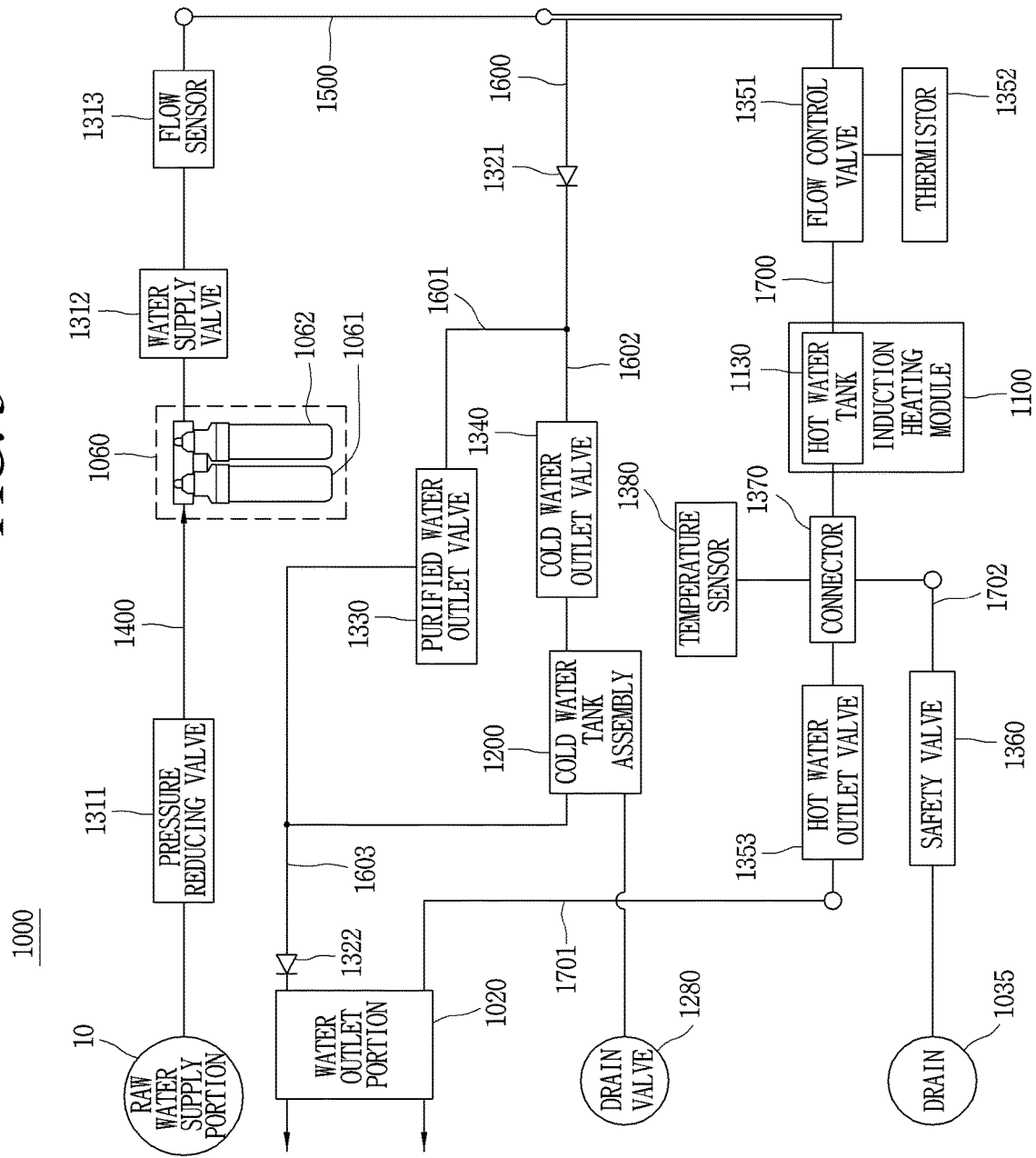
FIG. 3 is a conceptual view of an example passage configuration of the water purifier.

FIG. 3 illustrates an example passage configuration of an example water purifier 1000. A solid line in FIG. 3 indicates a passage of water. For the passage of water, an upstream side of the filter portion 1060 and a downstream side of the filter portion 1060 may be divided into a raw water line 1400 and a purified water line 1500, respectively, based on the filter portion 1060. The upstream or downstream side is divided based on the flow of water.

A water supply valve 1312 is open or closed based on a control command received through the input portion 1016 of FIG. 1. When a control command for discharging purified water, hot water or cold water is received through the input portion 1016, the water supply valve 1312 is open, and the supply of raw water is carried out from the raw water supply portion 10 to the filter portion 1060.

Raw water passes through a pressure reducing valve 1311 during the process of being supplied to the filter portion 1060. The pressure reducing valve 1311 is installed between the raw water supply portion 10 and the filter portion 1060. The pressure reducing valve 1311 is configured to reduce a pressure of raw water supplied from the raw water supply portion 10.

In some implementations, the tankless type water purifier 1000 may not be provided with a water tank, and thus a pressure of purified water discharged through the water outlet portion 1020 is determined by a pressure of raw water supplied from the raw water supply portion 10. Because a pressure of raw water supplied from the raw water supply portion 10 is high, water is discharged at an high pressure at the water outlet portion 1020 when there is no pressure reducing valve 1311. There may exist a danger in which the unit filters 1061, 1062 of the filter portion 1060 are physically damaged by a pressure of raw water. Accordingly, the pressure reduction of raw water is required.

The pressure reducing valve 1311 reduces a pressure of raw water supplied from the raw water supply portion 10 to the filter portion 1060. As a result, the filter portion 1060 may be protected, and water may be discharged at an appropriate pressure from the water outlet portion 1020.

Raw water is sequentially filtered while passing through the unit filters 1061, 1062 of the filter portion 1060. Water at an upstream side may be referred to as raw water, and water at a downstream side may be referred to as purified water based on the filter portion 1060.

Purified water generated from the filter portion 1060 passes through the water supply valve 1312 and a flow sensor 1313. The flow sensor 1313 is configured to measure a flow rate supplied from the filter portion 1060. The flow rate measured at the flow sensor 1313 is used for the control of the water purifier.

For example, when a control command for discharging a predetermined amount of purified water is received through the input portion 1016, a pulse value corresponding to the predetermined value is received at the flow sensor 1313 by the control module 1080, and the water supply valve 1312 is open by the control of the control module 1080. When a flow rate of purified water corresponding to the pulse value is passed through the flow sensor 1313, the control module 1080 receives a feedback from the flow sensor 1313 to control the water supply valve 1312, and the water supply valve 1312 is closed by the control of the control module 1080. A flow rate measured at the flow sensor 1313 through the foregoing process or the like may be used for the control of the water purifier 1000.

The purified water line 1500 connected to the flow sensor 1313 is branched into two sections 1600, 1700, and one section is connected to a flow control valve 1351 and the induction heating module 1100. This section connected to the flow control valve 1351 and the induction heating module 1100 may be referred to as a hot water line 1700. A check valve 1321 is installed at the remaining one section 1600, and this section is branched again into a purified water line 1601 and a cold water line 1602 at a downstream side of the check valve 1321. A purified water outlet valve 1330 is installed at the purified water line 1601, and a cold water outlet valve 1340 is installed at the cold water line 1602. The purified water line 1601 and cold water line 1602 are merged into one again and connected to the water outlet portion 1020, and a check valve 1322 is installed at the merged passage 1603.

Two check valves 1321, 1322 may be installed at an upstream and a downstream side of the cold water outlet valve 1340 and the cold water outlet valve 1340 may be referred to as a first check valve 1321 and a second check valve 1322 to be distinguished from each other. The first check valve 1321 and second check valve 1322 are provided to prevent the generation of residual water.

When a control command for supplying hot water is received at the water purifier, the water supply valve 1312, the flow control valve 1351 and a hot water outlet valve 1353 are open, and hot water is discharged through the hot water line 1700. During the process, a pressure within the purified water line 1601 and cold water line 1602 may decrease to cause a phenomenon in which the purified water outlet valve 1330 or cold water outlet valve 1340 are briefly open and then closed. There is no problem of residual water in a structure in which the water outlet portion 1020 has only one outlet cork, and both cold water and hot water are discharged through the outlet cork. However, in a structure in which both cold water and hot water are discharged through different outlet corks, a small amount of residual water may be discharged from one outlet cork while water is discharged from the other outlet cork.

In some implementations, the first check valve 1321 is installed at an upstream side of a branch point between the purified water line 1500 and the cold water line 1602, it may be possible to block a pressure change formed during the process of discharging hot water through the hot water line 1700 from being transferred to the purified water line 1601 and cold water line 1602. As a result, it may be possible to prevent the occurrence of a phenomenon in which the purified water outlet valve 1330 or cold water outlet valve 1340 from being instantaneously opened and then closed.

When a configuration in which the cold water outlet valve 1340 is installed at an upstream side of the cold water tank assembly 1200 and a configuration in which the which the cold water outlet valve 1340 is installed at a downstream side of the cold water tank assembly 1200 are compared with each other, it may allow the former to obtain even a little more cold water compared to the latter. It is because an amount of cold water depends on a passage length between the cold water tank assembly 1200 and the cold water outlet valve 1340 can be further supplied. Accordingly, the cold water outlet valve 1340 may be preferably installed at an upstream side of the cold water tank assembly 1200 as illustrated in the drawing. However, in a structure in which the cold water outlet valve 1340 is installed at an upstream side of the cold water tank assembly 1200, residual water may be generated by a pressure change within the cold water line 1602, and a small amount of residual water may be discharged through the water outlet portion 1020 even though the discharge of water is stopped.

The second check valve 1322 may be installed at the merging passage 1603 between the purified water line 1601 and the cold water line 1602 to block a pressure change of the cold water line 1602 from being transferred to the water outlet portion 1020.

Purified water that has passed through the flow sensor 1313 may be immediately supplied to a user in a room-temperature state or supplied to a user subsequent to becoming hot water or cold water.

The purified water outlet valve 1330 and cold water outlet valve 1340 may be configured to open or close based on a control command received through the input portion 1016. When a control command for discharging purified water is received through the input portion 1016, the water supply valve 1312 and purified water outlet valve 1330 are open. Purified water generated from the filter portion 1060 is discharged to the water outlet portion 1020 through the purified water line 1601. Similarly, when a control command for discharging cold water is received through the input portion 1016, the water supply valve 1312 and cold water outlet valve 1340 are open. Purified water generated from the filter portion 1060 is introduced into the cold water tank assembly 1200 along the cold water line 1602 and cooled while passing through the cold water tank assembly 1200. Cold water generated from the cold water tank assembly 1200 is discharged through the water outlet portion 1020.

The drain valve 1280 may be installed at the cold water tank assembly 1200, cooling water filled in the cold water tank assembly 1200 may be discharged to an outside through the drain valve 1280.

The flow control valve 1351 may be installed on the hot water line 1700. When a flow rate above an appropriate amount is introduced into the hot water tank 1130, it may be controlled to always introduce only a flow rate with an appropriate amount since sufficient heating may not be carried out. The flow control valve 1351 is installed at an upstream side of the induction heating module 1100 and formed to adjust a flow rate of purified water introduced into the hot water tank 1130.

A thermistor 1352 may be also installed at the flow control valve 1351. The temperature of purified water measured by the thermistor 1352 is used for the control of the induction heating module 1100. For example, when the temperature of purified water measured by the thermistor 1352 is relatively low, the induction heating module 1100 may be operated at high power. On the contrary, when the temperature of purified water measured by the thermistor 1352 is relatively low, the induction heating module 1100 may be operated at low power.

The hot water lines 1700, 1701 may be divided into an upstream side and a downstream side based on the induction heating module 1100. The hot water line 1700 at an upstream side is branched from the purified water line 1500 and connected to the hot water tank 1130 of the induction heating module 1100. The downstream side hot water line 1701 at a downstream side is connected to the water outlet portion 1020 to form a discharge passage of hot water generated from the hot water tank 1130 of the induction heating module 1100.

The hot water outlet valve 1353 is installed at the downstream side hot water line 1701, and configured to open or close the hot water lines 1700, 1701. The hot water outlet valve 1353 is operated by a control command received at the water purifier 1000. When a control command for discharging hot water is received through the input portion 1016, the water supply valve 1312 and hot water outlet valve 1353 are open to discharge hot water along the upstream side hot water line 1700 and the downstream side hot water line 1701.

In order to measure a temperature of hot water discharged along the downstream side hot water line 1701, a temperature sensor 1380 may be installed at the hot water outlet valve 1353. However, as a distance between the water outlet portion 1020 and the hot water outlet valve 1353 increases, a lot of residual water may remain between the hot water outlet valve 1353 and the water outlet portion 1020.

As a result, the residual water may fall through the water outlet portion 1020 even after the discharge of water is stopped by a control command received at the input portion. Accordingly, the hot water outlet valve 1353 may be disposed closer to the water outlet portion 1020 to reduce the residual water.

Assuming that a distance between the induction heating module 1100 and the water outlet portion is constant, the hot water outlet valve 1353 being disposed closer to the water outlet portion 1020 denotes that the hot water outlet valve 1353 is located farther from the induction heating module 1100. However, when the hot water outlet valve 1353 is located farther from the induction heating module 1100, accurate control on induction heating becomes difficult.

It is because the control of induction heating is carried out based on a temperature generated from the hot water tank 1130 of the induction heating module 1100. When the hot water outlet valve 1353 is located farther from the hot water tank 1130, hot water generated from the hot water tank 1130 is naturally cooled while flowing up to the hot water outlet valve 1353. Accordingly, there exists a difference between a temperature of hot water generated from the hot water tank 1130 and a temperature of hot water passing through the hot water outlet valve 1353, and the difference increases as a distance between the hot water tank 1130 and the hot water outlet valve 1353 increases.

For example, since water is evaporated at temperatures above 100° C., the temperature of hot water generated from the hot water tank 1130 may be controlled to be less than 100° C. When the temperature sensor 1380 is installed at the hot water outlet valve 1353, the temperature of hot water measured at the temperature sensor 1380 may be less than 100° C. due to the natural heat loss while the temperature of hot water generated from the hot water tank 1130 is over 100° C. As a result, there is a possibility of an inaccurate control.

Accordingly, in order to solve a problem of malfunction or control error generated due to a temperature difference, the temperature sensor 1380 may be preferably disposed closer to the hot water tank 1130 to accurately measure the temperature of hot water generated from the hot water tank 1130, and the temperature may be used for the control of induction heating.

The present disclosure provides a connector 1370 and the water purifier 1000 having a structure in which the temperature sensor 1380 is coupled to the connector 1370. The connector 1370 is connected to the hot water tank 1130 and the downstream side hot water line 1700. The connector 1370 forms a water discharge passage connected to the downstream side hot water line 1701.

Referring to FIG. 3, the temperature sensor 1380 is coupled to the connector 1370. The temperature sensor 1380 is exposed to hot water passing through the connector 1370 to measure a temperature of hot water passing through the water discharge passage of the connector 1370.

The connector 1370 may be directly connected to the hot water tank 1130 or connected to the hot water tank 1130 by an additional passage. Even when the connector 1370 is connected to the hot water tank 1130 by an additional passage, it may be disposed to be very close to the hot water tank 1130. Since the temperature sensor 1380 is coupled to the connector 1370, when the connector 1370 is disposed close to the hot water tank 1130, a difference between a temperature of hot water measured at the temperature sensor 1380 and a temperature of hot water generated from the hot water tank 1130 becomes very small.

The output of induction heating may be controlled by the temperature of hot water measured at the temperature sensor 1380. The control of induction heating based on the structure of the present disclosure may have a higher accuracy than that of the control of induction heating based on a structure in which the temperature sensor 1380 is installed at the hot water outlet valve 1353.

Referring to FIG. 3, the connector 1370 may be disposed between the hot water outlet valve 1353 and the hot water tank 1130. If a distance between the hot water tank 1130 and the hot water outlet valve 1353 is constant, then it may be possible to enhance the accuracy of temperature measurement as the connector 1370 is close to the hot water tank 1130. As a result, the connector 1370 may be preferably disposed to be relatively closer to the hot water tank 1130 than the hot water outlet valve 1353.

For example, a distance between the hot water tank 1130 and the hot water outlet valve 1353 may be about 200 mm. Accordingly, when a distance between the connector 1370 and the water outlet pipe 1132*b* (refer to FIG. 5) is less than 200 mm, it may be possible to implement more accurate control of induction heating.

The connector 1370 has passages in three ways. A first passage is connected to the hot water tank 1130, and a second passage is connected to the water outlet portion 1020, and a third passage is connected to a safety line 1702.

A safety valve 1360 may be installed on the safety line 1702 branched from the connector. The safety valve 1360 is formed to operate due to a pressure change of a passage provided in the water purifier 1000. When the passage of the water purifier 1000 is excessively pressurized above a safety reference pressure such as a case where the induction heating module 1100 is abnormally operated, the safety valve 1360 is open to prevent the damage of the water purifier 1000 due to overpressure, and purified water is discharged through the drain 1035.

Figure 4:
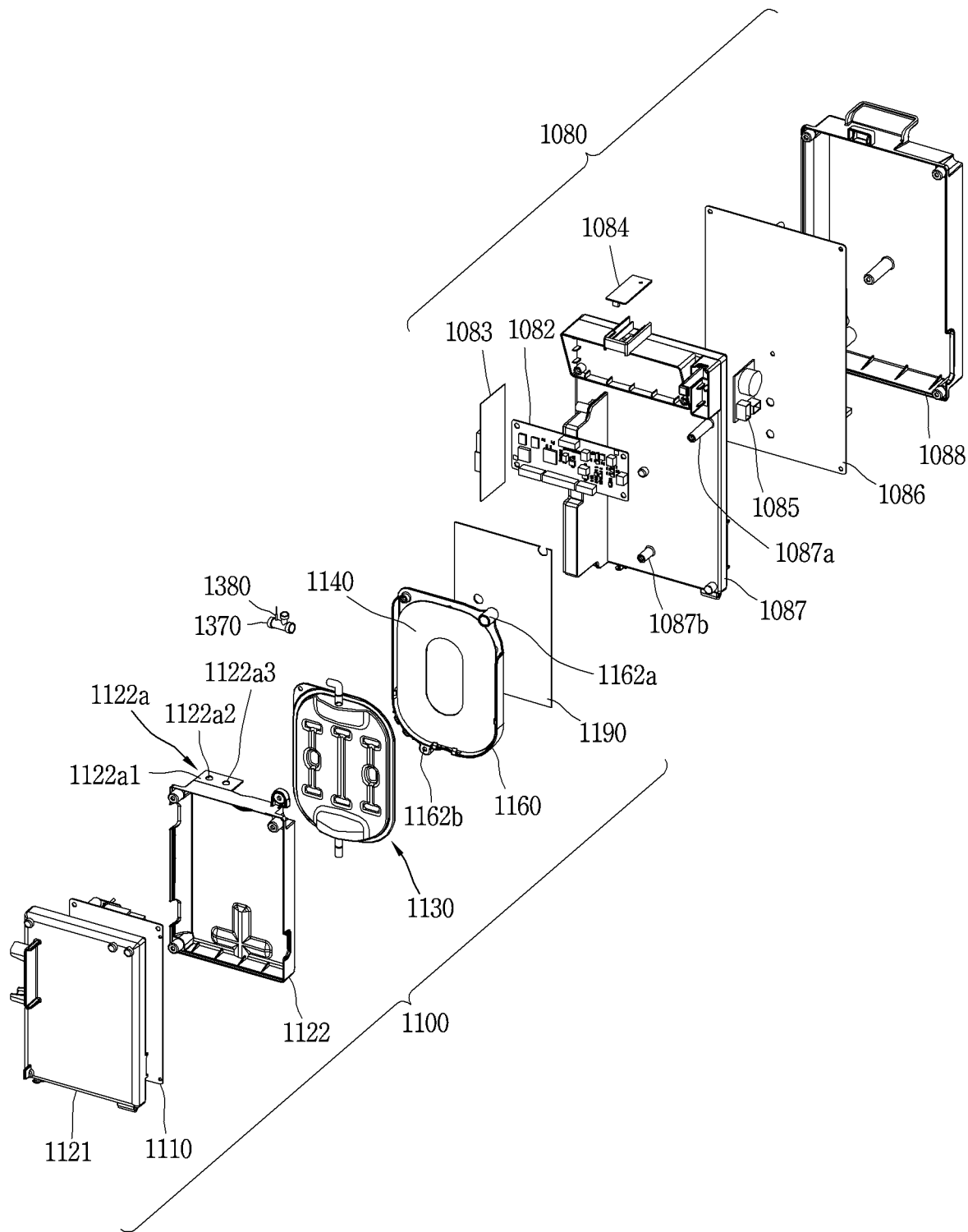
FIG. 4 is an exploded perspective view showing an example induction heating module and an example control module.

FIG. 4 is an exploded perspective view illustrating the induction heating module 1100 and the control module 1080.

The induction heating module 1100 indicates a set of components for receiving purified water produced from the filter portion 1060 to produce hot water. In some implementations, an example tankless type water purifier may not be provided with an additional water tank and purified water may be directly supplied to the induction heating module 1100 from the filter portion 1060.

The induction heating module 1100 may include an induction heating printed circuit board 1110, an induction heating printed circuit board cover 1121, 1122, a hot water tank 1130, a working coil 1140, a bracket 1160, and a shield plate 1190.

The induction heating printed circuit board 1110 controls an induction heating operation of the working coil 1140. Both ends of the working coil 1140 is connected to the induction heating printed circuit board 1110 and controlled by the induction heating printed circuit board 1110. For example, when a user enters a control command through the input portion 1016 of the water purifier 1000 to get hot water, purified water produced from the filter portion 1060 is supplied to the hot water tank 1130. The induction heating printed circuit board 1110 controls the working coil 1140 to flow a current. The hot water tank 1130 is induction-heated by a current supplied to the working coil 1140. Purified water is instantaneously heated while passing through the hot water tank 1130 to become hot water.

The induction heating printed circuit board covers 1121, 1122 are configured to surround the induction heating printed circuit board 1110. The induction heating printed circuit board covers may include a first induction heating cover 1121 and a second induction heating cover 1122.

The induction heating printed circuit board 1110 is installed in an inner space formed by the first induction heating cover 1121 and second induction heating cover 1122. The first induction heating cover 1121 and second induction heating cover 1122 are coupled to each other by the edges thereof to prevent the infiltration of water. Furthermore, a sealing member configured to prevent the infiltration of water may be coupled to the edges of first induction heating cover 1121 and second induction heating cover 1122. The first induction heating cover 1121 and second induction heating cover 1122 may be preferably formed of a flame retardant material to prevent the damage of the induction heating printed circuit board 1110 due to fire.

The purified water is heated in the hot water tank 1130. The hot water tank 1130 is configured to receive induction heat by the effect of magnetic field formed by the working coil 1140. The purified water becomes hot while passing through the inner space of the hot water tank 1130 that is configured to maintain airtight sealing.

In some implementations, the size of the hot water tank 1130 may be required to be reduced for a water supply apparatus such as the water purifier 1000, refrigerator, or the like. A thickness as well as a length or width of the hot water tank 1130 may be reduced compared to the related art to implement the miniaturization of the water supply apparatus. Accordingly, it may be possible to easily implement the miniaturization of the supper supply apparatus. For example, the hot water tank 1130 may be in a flat shape. An example hot water tank 1130 in a flat shape illustrated in FIG. 4 may have several problems.

The first problem may be deformation of the hot water tank 1130. When liquid is heated in the inner space of the hot water tank 1130, the liquid is expanded. According to the expansion of liquid, the pressure of the inner space is abruptly increased. The abrupt increase of the pressure causes the deformation of the hot water tank 1130.

The second problem may be insufficient heating. When liquid is heated using a large-sized hot water tank assembly 1130, a time required to heat liquid is sufficient, and thus the liquid may be sufficiently heated. However, the small-sized hot water tank 1130 is unable to have a sufficient time capable of heating the liquid, and thus there is a concern in which the liquid cannot be sufficiently heated.

Although the two problems above are not necessarily caused by the miniaturization of the hot water tank 1130, the severity of the problems may be further increased as the hot water tank 1130 becomes even smaller. The hot water tank 1130 of the present disclosure has a structure capable of solving the problems. The detailed structure of the hot water tank 1130 will be described later with reference to FIG. 5.

The working coil 1140 forms magnetic field lines for the induction heating of the hot water tank 1130. The working coil 1140 is disposed at one side of the hot water tank 1130 to face the hot water tank 1130. When a current is supplied to the working coil 1140, magnetic field lines are formed from the working coil 1140. The magnetic field lines gives an effect on the hot water tank 1130, and the hot water tank 1130 receives the effect of magnetic field lines to implement induction heating.

The shield plate 1150 is disposed at one side of the working coil 1140. The shield plate 1150 is disposed at an opposite side of the hot water tank 1130 based on the working coil 1140. The shield plate 1150 is to prevent magnetic field lines generated from the working coil 1140 from being radiated into the remaining region excluding the hot water tank 1130. The shield plate 1150 may be formed of aluminium or other materials for changing the flow of magnetic field lines.

The connector 1370 is connected to the hot water tank 1130. The connector 1370 may be directly connected to the hot water tank 1130, but connected by an additional passage. Even when the connector 1370 is connected to the hot water tank 1130 by an additional passage, the additional passage may preferably have a short length.

The temperature sensor 1380 is coupled to the connector 1370. The temperature sensor 1380 is configured to measure a temperature of hot water passing through the connector 1370. As the connector 1370 is disposed closer to the hot water tank 1130, the accuracy of a temperature value measured at the temperature sensor 1380 increases.

A connecting portion 1122*a* allowing the connector 1370 to be fixed to an inside of the water purifier 1000 may be formed on the induction heating printed circuit board cover 1122. The connecting portion 1122*a* may include a base 1122*a*1, a first hole 1122*a*2 formed on the base 1122*a*1, and a second hole 1122*a*3. The connecting portion 1122*a* may not be necessarily formed on the induction heating printed circuit board cover 1122, and the position of the connecting portion 1122*a* may be changed in design if it is allowed to fix the connector 1370.

A connection structure between the connecting portion 1122*a* and the connector 1370 will be described below.

The control module 1080 may include a control printed circuit board 1082, a noise printed circuit board 1083, a near field communication (NFC) printed circuit board 1084, a buzzer 1085, a main printed circuit board 1086, a main printed circuit board covers 1087, 1088.

The control printed circuit board 1082 is a sub-configuration of a display printed circuit board. The control printed circuit board 1082 is not an essential configuration for driving a water supply apparatus such as the water purifier 1000, but performs the secondary role of the display printed circuit board.

The noise printed circuit board 1083 is to provide power to the induction heating printed circuit board 1110. Because an induction heating requires a very high output voltage, a sufficient power should be supplied. The noise printed circuit board 1083 is not an essential configuration for driving a water supply apparatus such as the water purifier 1000. However, the water supply apparatus such as the water purifier 1000 may have the noise printed circuit board 1083 to prepare for a case where power required for induction heating is not sufficiently supplied. The noise printed circuit board 1083 may supply additional power to the induction heating printed circuit board 1110 to satisfy an output voltage for induction heating. The noise printed circuit board 1083 may perform the role of providing secondary power to other configurations as well as the induction heating printed circuit board 1110.

The buzzer 1085 outputs an audio sound to provide accurate failure information to a user when a failure has occurred on a water supply apparatus such as the water purifier 1000. The buzzer 1085 may output a specific audio sound of a preset code according to the failure.

The NFC printed circuit board 1084 is to send and receive data to and from a communication device. In recent years, personal communication devices such as a smart phone have been widely used. Accordingly, when a consumer is able to check the status of a water purifier or enter a control command using a personal communication device, it may be possible to enhance the convenience of the consumer. The NFC printed circuit board 1084 may provide the status information of a water supply apparatus to a personal communication device paired therewith, and receive a user's control command from the personal communication device.

The main printed circuit board 1086 controls the overall operation of a water supply apparatus such as the water purifier 1000. The operation of the input/output portion 1016 illustrated in FIG. 1 or the compressor 1051 illustrated in FIG. 2 may be also controlled by the main printed circuit board 1086. When power is insufficient, the main printed circuit board 1086 may receive the insufficient power through the noise printed circuit board 1083.

The main printed circuit board cover 1087, 1088 is configured to surround the main printed circuit board 1086. The main printed circuit board cover 1087, 1088 may include a first main cover 1087 and a second main cover 1088.

The main printed circuit board 1086 is installed in an inner space formed by the first main cover 1087 and second main cover 1088.

The first main cover 1087 and second main cover 1088 are coupled to each other by the edges to prevent the infiltration of water. A sealing member may be installed on the first main cover 1087 and second main cover 1088 to prevent the infiltration of water. Furthermore, the first main cover 1087 and second main cover 1088 may be preferably formed of a flame retardant material to prevent the damage of the main printed circuit board 1086 due to fire.

An example structure of a hot water tank 1130 for deformation prevention and flow rate distribution (or flow speed control) will be described. Furthermore, a structure capable of maintaining a predetermined distance between the working coil 1140 and the hot water tank 1130 will be described.

Figure 5:
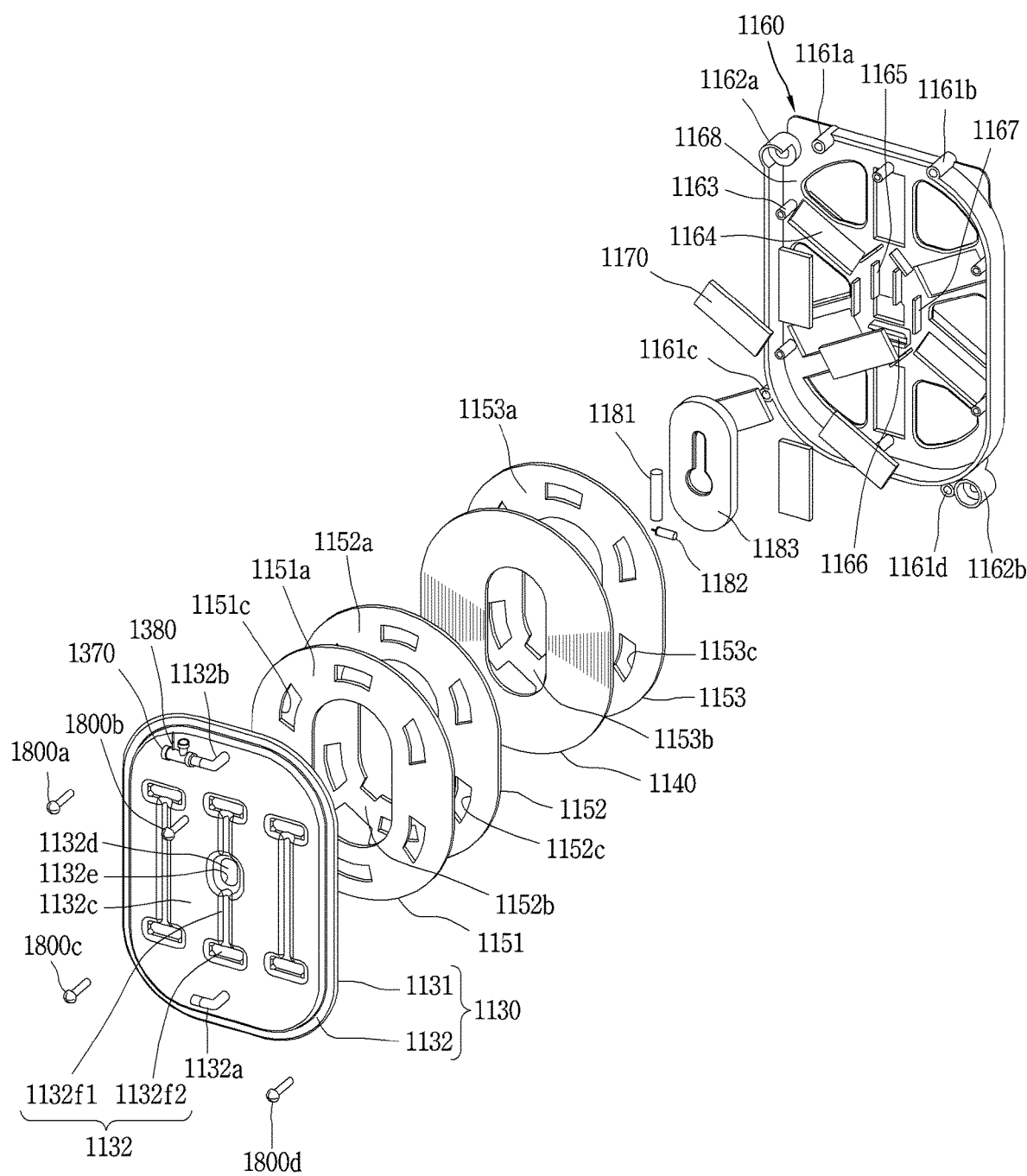
FIG. 5 is an exploded perspective showing example parts of the induction heating module.

FIG. 5 is an exploded perspective view of example elements of an example induction heating module.

The hot water tank 1130 is formed by coupling the edges of a first cover 1131 and a second cover 1132 to each other. An edge of the first cover 1131 and an edge of the second cover 1132 may be coupled to each other by welding or the like to maintain airtight sealing. The hot water tank 1130 is provided with an inner space for heating liquid. The inner space is formed by a coupling between the first cover 1131 and the second cover 1132.

The hot water tank 1130 may include an water inlet pipe 1132*a* and an water outlet pipe 1132*b*. The water inlet pipe 1132*a* and water outlet pipe 1132*b* may be formed on the second cover 1132. The water inlet pipe 1132*a* corresponds to a passage into which liquid to be heated is introduced. The water outlet pipe 1132*b* corresponds to a passage into which liquid that has been heated is discharged. The water inlet pipe 1132*a* and water outlet pipe 1132*b* may be formed at opposite sides to each other.

The connector 1370 is connected to the water outlet pipe 1132*b* of the hot water tank 1130. As a result, the connector 1370 forms a water outlet passage connected to the downstream side hot water line 1701 from the hot water tank 1130. The water outlet pipe 1132*b* is protruded from the water outlet pipe 1132*b*, and at least a partial region thereof may be bent. As the water outlet pipe 1132*b* is bent toward the connector 1370, and inserted into an inlet of the connector 1370, coupling between the connector 1370 and the hot water tank 1130 is carried out.

The first cover 1131 is configured to receive the effect of magnetic field lines formed by the working coil 1140 to generate heat. The first cover 1131 receives induction heating by the working coil 1140, and thus a distance between the first cover 1131 and working coil 1140 may be constantly maintained to accurately control an induction heating output. Accurate control of induction heating denotes controlling the output of the induction heating module 1100.

If the working coil 1140 is getting out of a reference position, it is difficult to accurately control the induction heating output. The reference position is an optimized position of the working coil 1140 at which induction heating by the working coil 1140 can be accurately controlled. A distance between the first cover 1131 and the working coil 1140 is maintained by spacers 1151, 1152.

When a portion of the first cover 1131 is too far separated from or too close to the working coil 1140 compared to the reference position, it may be difficult to accurately control the induction heating of the one portion. Accordingly, the first cover 1131 preferably has a flat shape to uniformly locate the entire portion of the first cover 1131 at a proper distance from the working coil 1140.

The first cover 1131 may be formed of an appropriate material for generating heating. The first cover 1131 may be formed of a stainless material, and preferably formed of 4-series stainless steel. In some implementations, the first cover 1131 may be formed of an STS (Stainless Steel, Korean Industrial Standard) 439 material. The STS 439 has an enhanced corrosion resistance compared to STS 430. Corrosion resistance indicates a property capable of suppressing corrosion due to contact with water. The first cover 1131 may have a thickness of about 0.8 mm.

The second cover 1132 has a low relevance compared to that of the first cover 1131 since the second cover 1132 is disposed at an opposite side to the working coil 1140 based on the first cover 1131 and has a low effect of magnetic field lines. Accordingly, the second cover 1132 may be formed of a material having a corrosion resistance than heat generation characteristics. The second cover 1132 may be formed of a stainless material, and preferably formed of a 3-series stainless material. More preferably, the second cover 1132 may be formed of an STS 304 material. The supporting member 304 has an enhanced corrosion resistance compared to the STS 439. The second cover 1132 may have a thickness of about 1.0 mm.

The second cover 1132 may not necessarily maintain a predetermined distance from the working coil 1140 since the second cover 1132 is less relevant to induction heating. Accordingly, one portion of the second cover 1132 may be farther away from the working coil 1140 or disposed close to the working coil compared to the other portion thereof.

The second cover 1132 may include a base surface 1132c, a protruding surface 1132d, a welding portion 1132e, a protrusion portion 1132f. The base surface 1132c, protruding surface 1132d and protrusion portion 1132f may be integrally formed by pressing processing. When press processing is partially carried out on the second cover 1132 having the base surface 1132c, the protruding surface 1132d and protrusion portion 1132f may be formed on the second cover 1132. Being integrally formed does not denote being formed with separate constituent elements but denotes being formed with one constituent element, and the base surface 1132c, protruding surface 1132d and protrusion portion 1132f should be understood to be referred to as to distinguish any one portion thereof from another portion thereof. The base surface 1132c, protruding surface 1132d and protrusion portion 1132f are designated names indicating different portions of the second cover 1132.

The base surface 1132c faces the first cover 1131 at a position separated from the first cover 1131. In the above, the hot water tank 1130 has been described to include an inner space for heating liquid. The base surface 1132c is separated from the first cover 1131 to form the inner space.

The protruding surface 1132d is protruded toward the first cover 1131 from the base surface 1132c. The protruding surface 1132d may be closely adhered to the first cover 1131. A circumference of the protruding surface 1132d connects the base surface 1132c and protruding surface 1132d to each other. When press processing is carried out to form the protruding surface 1132d, a circumference connected between the base surface 1132c and the protruding surface 1132d is naturally formed. The circumference of the protruding surface 1132d may be formed in an inclined manner.

The welding portion 1131e is formed by welding of the first cover 1131 and second cover 1132. More specifically, the welding portion 1131e is formed by welding of the first cover 1131 and protruding surface 1132d. Accordingly, the welding portion 1131e may be formed on the first cover 1131 as well as formed on the protruding surface 1132d.

The base surface 1132c is separated from the first cover 1131 to form an inner space of the hot water tank 1130, and thus cannot be welded to the first cover 1131. Since the circumference of the protruding surface 1132d is away from the first cover 1131 as being closer to the base surface 1132c, it is difficult to be welded to the first cover 1131. The protruding surface 1132d is protruded to be closely adhered to the first cover 1131, and it is easily welded to the first cover 1131. The protruding surface 1132d is a configuration required to form the welding portion.

The welding portion 1131e is to prevent the deformation of the first cover 1131. When the temperature of liquid is increased within the hot water tank 1130 by the operation of the induction heating module 1100a, the liquid is gradually expanded and a pressure within the hot water tank 1130 is gradually increased. It is known that when water is evaporated to become steam, the volume increases by about 1700 times, a pressure within the hot water tank 1130 may increase to a very high level during the hot water generation process. Furthermore, the rapidly increased internal pressure of the hot water tank 1130 may cause the deformation of the first cover 1131.

There is a condition in which the first cover 1131 should have a flat plate shape to carry out the accurate control of induction heating, and a flat plate has a restriction in having a structure for deformation prevention due to a pressure increase. The welding portion 1131e is introduced to prevent the deformation of the first cover 1131 within such a restriction.

Welding is an operation of locally applying heat to a position desired for adhesion to melt a part of metallic material and rearrange atomic bonds to adhere two metallic materials to each other. Adhesion by welding has a very strong binding force due to the rearrangement of atomic bonds. The welding portion 1131e is formed by welding of the protruding surface 1132d and first cover 1131, and thus it will be described that the first cover 1131 has the welding portion 1131e, and also will be described that the second cover 1132 has the welding portion 1131e, and will be described that the first cover 1131 and second cover 1132 have welding portion 1132e. Moreover, it may be also described that the welding portion 1131e is formed between the first cover 1131 and the second cover 1132. Though the welding portion of the second cover 1132 is not illustrated in FIG. 5, it may be possible to derive the shape and position thereof from the welding portion 1131e of the first cover 1131.

The welding portion 1131e strongly couples the first cover 1131 to the second cover 1132, the deformation of the first cover 1131 may be prevented even though an internal pressure of the hot water tank 1130 is increased. Moreover, it should be understood that the welding portion 1131e can prevent the deformation of the second cover 1132 as well as the first cover 1131 in the aspect of coupling the first cover 1131 to the second cover 1132 each other.

The position of the welding portion 1132e is not limited to a specific location. However, the welding portion 1132e is preferably formed at a position that does not overlap with the temperature sensor 1181, but it is not necessarily required. The overlapping position denotes the welding portion 1132e and temperature sensor 1181 being projected onto the same region when the working coil assembly 1140 is seen in the front side from the second cover 1132.

The temperature sensor 1181 is disposed at an opposite side to the second cover 1132 based on the first cover 1131. The temperature sensor 1181 is configured to measure the temperature of liquid passing through the inner space of the hot water tank 1130. When the temperature of liquid is measured by the temperature sensor 1181, the liquid should exist at a position overlapping with the temperature sensor 1181. However, if the welding portion 1131e is formed at a position overlapping with the temperature sensor 1181, the liquid does not exist at a position overlapping with the temperature sensor 1181, and only the welding portion 1131e exists. Accordingly, in the foregoing structure, hot water measurement due to the temperature sensor 1181 may be inaccurate.

The welding portion 1131e has a closed curve shape. If the welding portion 1131e is formed in a shape having an end point such as a straight line or curved line, then the effect of a high pressure formed within the hot water tank 1130 is concentrated on the end point. Accordingly, the separation of the first cover 1131 from the second cover 1132 may occur from the end point. On the contrary, when the welding portion 1131e has a closed curve shape, the effect of a high pressure may be uniformly distributed on the closed curve shape without being concentrated on any one portion thereof. Accordingly, the welding portion 1131e with a closed curve shape may enhance the breakdown performance of the hot water tank 1130.

The closed curve referred to as in the present disclosure denotes a diagram with the same start point and end point when one point is taken on a straight line or curved line. For example, a polygon as well as a circle, an ellipse corresponds to the closed curve, and the closed curve may not be necessarily formed only with a curved line, and formed by a set of straight lines. Accordingly, a name such as a closed diagram or a single closed curve may be used instead of a name such as a closed curve.

The protrusion portion 1132f is protruded toward the first cover 1131 from the base surface 1132c. Unlike the protruding surface 1132d which is closely adhered to the first cover 1131, the protrusion portion 1132f maintains a separated state from the first cover 1131 without being closely adhered to the first cover 1131. However, the protrusion portion 1132f is formed closer to the first cover 1131 than the base surface 1132c.

The protrusion portion 1132f is extended toward the water inlet pipe 1132a and water outlet pipe 1132b of the hot water tank 1130. For example, when the water inlet pipe 1132a and water outlet pipe 1132b are disposed at opposite sides based on a top-down direction of the hot water tank 1130, the protrusion portion 1132f may be also extended in a top-down direction toward the water inlet pipe 1132a and water outlet pipe 1132b. The rigidity (strength) of the second cover 1132 may be enhanced through the structure of the protrusion portion 1132f being protruded toward the first cover 1131 and extended toward the water inlet pipe 1132a and water outlet pipe 1132b.

The protrusion portion 1132f is provided for the deformation prevention of the second cover 1132 and the flow rate distribution of liquid (or flow speed control of liquid). As described above, when an internal pressure of the hot water tank 1130 increases, it may cause the deformation of the second cover 1132 as well as the first cover 1131. The rigidity of the second cover 1132 is enhanced through the structure in which protrusion portion 1132f is extended in a protruded state, the deformation of the second cover 1132 may be prevented by the protrusion portion 1132f even when the internal pressure of the hot water tank 1130 increases. Moreover, the second cover 1132 is strongly coupled to the first cover 1131 by the welding portion 1131e, and therefore, the deformation of the second cover 1132 may be prevented by an interaction between the welding portion 1131e and the protrusion portion 1132f.

The protrusion portion 1132f has a predetermined width in a direction crossing an extension direction. For example, the extension direction of the protrusion portion 1132f is a top-down direction toward the water inlet pipe 1132a and water outlet pipe 1132b. A direction crossing the extension direction is a left-right direction. Since the protrusion portion 1132f has a predetermined width in a left-right direction, particles in liquid introduced through the water inlet pipe 1132a collide with the protrusion portion 1132f. Furthermore, the collided particles in liquid are dispersed in all directions. Through such a mechanism, the protrusion portion 1132f may distribute a flow rate into various places within the hot water tank 1130.

The protrusion portion 1132f controls a flow speed. For example, the protrusion portion 2132 forms a flow resistance to reduce a flow speed of liquid. As particles in liquid introduced to the hot water tank 1130 through the water inlet pipe 1132a collide with the protrusion portion 1132f, they receive a resistance in the flow rate. Accordingly, when particles in liquid collide the protrusion portion 1132f, the flow speed of liquid decreases. It is to prevent the liquid from being excessively rapidly discharged without being sufficiently heated within the hot water tank 1130. The protrusion portion 1132f control a flow speed to allow the liquid to sufficiently stay in the hot water tank 1130. Accordingly, the liquid may be sufficiently heated within the hot water tank 1130.

A protrusion portion 1132f may include a first protrusion portion 1132f1 and a second protrusion portion 1132f2.

The first protrusion portion 1132f1 is extended toward a water inlet pipe 1132a and a water outlet pipe 1132b of the hot water tank assembly 3130. The first protrusion portion 1132f1 is to prevent the deformation of the second cover 3132 rather than the distribution of a flow rate. The first protrusion portion 1132f1 may have a smaller width than that of the first protrusion portion 1132f1.

The second protrusion portion 1132f2 is extended in a direction crossing an extension direction of the first protrusion portion 1132f1. For example, the first protrusion portion 1132f1 is extended in a top-down direction, and the second protrusion portion 1132f2 is extended in a left-right direction.

A left-right extension length of the second protrusion portion 1132f2 is larger than a width of the first protrusion portion 1132f1. It is because the second protrusion portion 1132f2 is a configuration for the distribution of a flow rate and the control of a flow speed rather than the deformation prevention of the second cover 1132. In order to disperse liquid to be heated from the hot water tank assembly 1130, the second protrusion portion 1132f2 should collide with particles in liquid. The extension width of the second protrusion portion 1132f2 is formed to be larger than that of the first protrusion portion 1132f1. Furthermore, the second protrusion portion 1132f2 may be relatively closer to the first cover 1131 compared to the first protrusion portion 1132f1 to provide a collision area.

The second protrusion portions 1132f2 may be formed at both end portions of the first protrusion portion 1132f1, respectively. When both the end portions of the first protrusion portion 1132f1 are referred to as a first end portion and a second end portion, respectively, in FIG. 5, the first end portion is disposed closer to the water inlet pipe 1132a, and the second end portion is disposed closer to the water outlet pipe 1132b. The second protrusion portions 1132f2 may be formed at a first end portion and a second end portion of the first protrusion portion 1132f1 or formed between the first end portion and the second end portion.

The hot water tank 1130 may include a plurality of first protrusion portions 1132f1 second protrusion portions 1132f2. At least part of the plurality of second protrusion portions 1132f2 are disposed to be brought into contact with liquid introduced through the water inlet pipe 1132a or liquid to be discharged through the water outlet pipe 1132b. The contact with liquid denotes collision with liquid particles. The flow rate distribution and flow speed control may be carried out through the structure of the second protrusion portion 1132f2.

The second protrusion portions 1132f2 formed at a first end portion (an end portion at a side of the water inlet pipe 1132a) of the first protrusion portion 1132f1 are to distribute a flow rate and control a flow rate. Liquid particles introduced into the hot water tank 1130 through the water inlet pipe 1132a collide with the second protrusion portions 1132f2 to disperse a flow rate of liquid in all directions. As a result, liquid may be sufficiently heated within the hot water tank 1130.

The second protrusion portions 1132f2 formed at a second end portion (an end portion at a side of the water outlet pipe 1132b) of the first protrusion portion 1132f1 are to control a flow speed. When liquids are mixed prior to being discharged from the hot water tank assembly 1130 according to the control of a flow speed, hot water in a uniform temperature range may be provided.

The first protrusion portion 1132f1 and second protrusion portion 1132f2 may be integrally formed by press processing. When press processing is carried out on the second cover 1132 having the base surface 1132c in consideration of an extension direction of the first protrusion portion 1132f1 and an extension direction of the second protrusion portion 1132f2, the first protrusion portion 1132f1 and second protrusion portion 1132f2 are integrally formed along with the base surface 3132c. Since a protruding surface 1132d can be formed by press processing, the protrusion portion 1132f and protruding surface 1132d may be formed at the same time by one time press processing.

The positions and number of the first protrusion portions 1132f1, second protrusion portions 1132f2 and welding portions 1132e may be selectively changed. The positions of the protrusion portions 1132f may not be necessarily limited. The protrusion portion 1132f may be also formed at a position overlapping with the temperature sensor 1181.

The working coil 1140 is disposed at one side of the hot water tank 1130. The working coil 1140 and hot water tank 1130 are disposed at separated positions to face each other. Referring to FIG. 5, it is illustrated that the working coil 1140 is disposed at a position facing an outer surface of the first cover 1131. For the sake of convenience of explanation, a surface of the first cover 1131 facing the second cover 1132 is referred to as an inner surface, and the other surface of the first cover 1131 facing the working coil 1140 is referred to as an outer surface. Accordingly, one side of the hot water tank 1130 corresponds to a position facing an outer surface of the first cover 1131.

The working coil 1140 is formed by a conducting wire wound in an annular shape. The working coil 1140 may be formed with a single or several strands of copper or other conducting wires. When the working coil 1140 is formed with several strands of conducting wires, each strand is insulated.

The working coil 1140 forms a magnetic field or magnetic field lines by a current applied to the working coil 1140. The first cover 1131 receives the effect of magnetic field lines formed by the working coil 1140 to generate heat.

Since the hot water tank 1130 is induction heated by the working coil 1140, the maintenance of a predetermined distance between the working coil 1140 and the hot water tank 1130 is very important. The spacer 1151, 1152 is disposed between the working coil 1140 and the hot water tank 1130 to maintain a predetermined distance between the working coil 1140 and the hot water tank 1130.

The spacer 1151, 1152 may require the followings six conditions.

The first condition may be that even when the spacer 1151, 1152 is pressurized by the hot water tank 1130 and working coil 1140, the spacer 1151, 1152 is able to maintain a constant distance between the working coil 1140 and the hot water tank 1130. In order to accurately control induction heating, it has been described in the above that a distance between the hot water tank 1130 and the working coil 1140 should be constantly maintained. In a state that the spacer 1151, 1152 is disposed between the hot water tank 1130 and the working coil 1140, when one surface of the spacer 1151, 1152 is closely adhered to the hot water tank 1130 and the other surface of the spacer 1151, 1152 is closely adhered to the working coil 1140, a distance between the hot water tank 1130 and working coil 1140 is determined by a thickness of the spacer 1151, 1152.

If the spacer 1151, 1152 is pressurized by the hot water tank 1130 and working coil 1140 and elastically deformed, then the thickness of the spacer 1151, 1152 may be smaller than the pressurization, and a distance between the hot water tank 1130 and the working coil 1140 cannot be constantly maintained. Accordingly, the spacer 1151, 1152 should maintain an original thickness without causing deformation even when pressurized by the hot water tank 1130 and working coil 1140.

If the spacer 1151, 1152 has an appropriate strength, then it may maintain an original thickness without causing elastic deformation even when pressurized by the hot water tank 1130 and working coil 1140. Accordingly, the first condition of the spacer 1151, 1152 has the same meaning as that it should have a strength that does not cause deformation even with pressurization by the hot water tank 1130 and working coil 1140.

The second condition may be that the spacer 1151, 1152 may maintain an electrical insulation between the hot water tank 1130 and the working coil 1140. A current is applied to the working coil 1140 for induction heating. However, when a current applied to the working coil 1140 is conducted through the hot water tank 1130, it causes an effect on the induction heating of the hot water tank 1130. It is because that the induction heating is heating using joule heating generated by an electrical resistance of the metal.

When an electrical insulation between the hot water tank 1130 and the working coil 1140 is not maintained, it is difficult to accurately control the induction heating of the hot water tank 1130. Since the spacer 1151, 1152 is disposed between the hot water tank 1130 and the working coil 1140, the spacer 1151, 1152 should be formed of an electrical insulator.

The third condition may be that the spacer 1151, 1152 may suppress heat transfer between the hot water tank 1130 and working coil 1140. When a current flows through the working coil 1140, the working coil 1140 generates heat, and the hot water tank 1130 induction heated by the working coil 1140 also generates heat, and thus there is a danger of fire due to excessive heating by two heating elements.

Furthermore, the induction heating module 1100 is controlled based on a temperature measured by the temperature sensor 1181. When the temperature sensor 1181 is affected by too many elements, an accurate control of the induction heating module is gradually deteriorated, and thus the number of elements causing an effect on the temperature sensor 1181 may be preferably small to accurately control the induction heating module 1100.

However, when heat transfer between the hot water tank 1130 and the working coil 1140 is not suppressed, the number of elements causing an effect on a temperature measured by the temperature sensor 1181 is large, and thus an accurate control of the induction heating module 1100 is gradually deteriorated. Since the spacer 1151, 1152 is disposed between the hot water tank 1130 and the working coil 1140, the spacer 1151, 1152 should suppress heat conduction between the hot water tank 1130 and the working coil 1140.

The fourth condition may be that the spacer 1151, 1152 may be formed of a flame retardant material having a thermal resistance. The spacer 1151, 1152 is disposed between the working coil 1140 and the hot water tank 1130, and the temperature of the working coil 1140 and hot water tank 1130 is increased up to about 150° C., and thus if the spacer 1151, 1152 does not have a thermal resistance, then it may be damaged by heat.

Accordingly, the spacer 1151, 1152 should be formed of a flame retardant material having a thermal resistance up to at least 200-300° C. not to be damaged even at a higher temperature than that of the heated working coil 1140 and the induction heated hot water tank 1130.

The spacer 1151, 1152 may be formed of any one of mica, quartz and glass to satisfy the first through the fourth condition. Mica, quartz or glass may maintain the thickness of itself even when pressurized by the hot water tank 1130 and working coil 1140, and they are flame retardant materials having electrical insulation, suppressed heat conduction, and sufficient thermal resistance properties.

Furthermore, the spacer 1151, 1152 may be formed of silicon (Si) to satisfy the second through the fourth condition. Silicon is a flame retardant material having electrical insulation, suppressed heat conduction, and sufficient thermal resistance properties. However, silicon may cause an elastic deformation when excessively pressurized by the hot water tank 1130 and working coil 1140. Accordingly, silicon may be used as a material of the spacer 1151, 1152 only when it is not excessively pressurized by the hot water tank 1130 and working coil 1140.

The fifth condition of the spacer 1151, 1152 may be that the spacer 1151, 1152 may have a structure capable of allowing the spacer 1151, 1152 to pass through both ends of the working coil 1140. The working coil 1140 is formed by a conducting wire in an annular shape, and an end thereof is extended from an inner side of the annular shape and connected to the induction heating printed circuit board 1110, and the other end of the working coil 1140 is extended from an outer side of the annular shape and connected to the induction heating printed circuit board 1110.

The spacer 1151, 1152 may be formed in an annular shape to correspond to the working coil 1140, and may include a first portion 1151a, 1152a and a second portion 1152b (covered by the hot water tank) to allow both ends of the working coil 1140 to pass therethrough. The first portion 1151a, 1152a forms a part of the annular shape. The second portion 1152b forms the remaining part of the annular shape, and has a smaller width than that of the first portion 1151a, 1152a. For example, the second portion 1152b is recessed at an inner side and an outer side of the annular shape, respectively, to have a smaller width than that of the first portion 1151a, 1152a. Accordingly, a gap capable of allowing both ends of the working coil 1140 to pass therethrough is formed at an inner side and an outer side of the annular shape. An end of the working coil 1140 passes through an inner side of the annular shape, and the other end of the working coil 1140 passes through an outer side of the annular shape.

The sixth condition of the spacer 1151, 1152 may be that the spacer 1151, 1152 may be formed with a structure capable of implementing the cooling of the working coil 1140. Since heat generated from the hot water tank 1130 by induction heating is transferred to liquid passing through the hot water tank 1130, cooling due to liquid is carried out on the hot water tank 1130. On the contrary, since the working coil 1140 is closely adhered to the spacer 1151, 1152 and an insulator 1153 which will be described later, and the spacer 1151, 1152 and insulator 1153 are configured to suppress heat transfer, the working coil 1140 has no target to transfer heat excluding air.

Accordingly, an area capable of allowing the working coil 1140 to be sufficiently brought into contact with air should be provided to carry out the cooling of the working coil 1140. The spacer 1151, 1152 may include a hole 1151c, 1152c for allowing the hot water tank 1130 and working coil 1140 to face each other. The hole 1151c, 1152c may be formed on the first portion 1151a, 1152a, and a plurality of holes 8145c may be provided and formed to be separated from each other along the spacer 1151, 1152 in an annular shape.

The working coil 1140 and hot water tank 1130 are disposed to face each other at separated positions, and the working coil 1140 and hot water tank 1130 may face each other through the hole 1151c, 1152c. The working coil 1140 is separated from the hot water tank 1130, and thus the working coil 1140 may be brought into contact with air through the hole 1151c, 1152c. Accordingly, the hole 1151c, 1152c has a configuration for forming a contact area between the working coil 1140 and air.

Referring to FIG. 2, the water purifier 1000 may include a fan 1033, and wind generated by the fan 1033 promotes air flow within the water purifier 1000. Accordingly, when wind generated by the fan 1033 is transferred to the working coil 1140 through the hole 1151c, 1152c, it may further promote the cooling of the working coil 1140 compared to the natural convection of air.

A plurality of spacers 1151, 1152 may be provided therein. For example, when a distance between the hot water tank 1130 and the working coil 1140 may be constantly maintained at 3.5 mm, three gap spacers 1151 with a thickness of 1 mm and one spacer 1152 with a thickness of 0.5 mm may be disposed between the hot water tank 1130 and the working coil 1140. A plurality of gap spacers 8145 should be disposed to be closely adhered to each other to determine a distance between the hot water tank 1130 and working coil 1140 by a thickness of the spacer 1151, 1152.

The insulator 1153 may be disposed at an opposite side of the spacers 1151, 1152 based on the working coil 1140. It may be understood that the insulator 1153 is disposed between the working coil 1140 and a bracket 1160 which will be described later. The insulator 1153 may also satisfy the followings. However, a condition in which a gap should be maintained similarly to the spacers 1151, 1152 is not applicable to the insulator 1153.

The insulator 1153 may maintain an electrical insulation between the working coil 1140 and a core 1170. The core 1170 is provided to suppress a loss of current, and ferrite is typically used for the material of the core 1170. Accordingly, when a current applied to the working coil 1140 is transferred to ferrite which is a conductive material, it interferes with a normal operation of the core 1170. Accordingly, the insulator 1153 should be formed of a material capable of maintaining electrical insulation.

The insulator 1153 may suppress heat transfer between the working coil 1140 and the bracket 1160. The bracket 1160 may be formed by an injection mold, and an injection-molded product is typically weak to heat. Accordingly, when heat generated from the working coil 1140 is transferred to the bracket 1160, the bracket 1160 may be damaged by heat. The insulator 1153 should be formed of a material capable of suppressing heat transfer to prevent the bracket 1160 from being damaged by heat.

The insulator 1153 may be formed of a flame retardant material having a heat resistance. The reason that the insulator 1153 should be formed of a flame retardant material having a heat resistance is the same as the reason that the spacers 1151, 1152 should be formed of a flame retardant material having a heat resistance.

The insulator 1153 may be formed of any one of mica, quartz, glass and silicon (Si) to satisfy the first through the third condition. Mica, quartz, glass and silicon are flame retardant materials having electrical insulation, suppressed heat conduction, and sufficient thermal resistance properties. For example, the insulator 1153 may not require a condition associated with gap maintenance, and thus silicon may be used for the material of the insulator 1153 without any restriction.

The insulator 1153 should have a structure capable of allowing the insulator 1153 to pass through both ends of the working coil 1140. Having a structure capable of allowing the insulator 1153 to pass through both ends of the working coil 1140 is the same as having a structure capable of allowing the spacer 1151, 1152 to pass through both ends of the working coil 1140. As a result, the insulator 1153 may substantially have the same structure as that of the spacers 1151, 1152.

The insulator 1153 is formed in an annular shape to correspond to the working coil 1140, and may include a first portion 1153a and a second portion 1153b to allow both ends of the working coil 1140 to pass therethrough. The first portion 1153a forms a part of the annular shape. The second portion 1153b forms the remaining part of the annular shape, and has a smaller width than that of the first portion 1153a. For example the second portion 1153b may be recessed at an inner side and an outer side of the annular shape, respectively, to have a smaller width than that of the first portion 1153a. Accordingly, a gap capable of allowing both ends of the working coil 1140 to pass therethrough is formed at an inner side and an outer side of the annular shape. An end of the working coil 1140 passes through an inner side of the annular shape, and the other end of the working coil 1140 passes through an outer side of the annular shape.

The insulator 1153 is that the insulator 1153 should be formed with a structure capable of implementing the cooling of the working coil 1140. The reason that the insulator 1153 should be formed with a structure capable of implementing the cooling of the working coil 1140 is the same as the reason that the spacers 1151, 1152 should be formed with a structure capable of implementing the cooling of the working coil 1140. A hole 1153c for making contact with air with the working coil 1140 is also formed on the insulator 1153 similarly to the spacers 1151, 1152.

As described above, the spacers 1151, 1152 and insulator 1153 may satisfy the similar conditions excluding a gap maintenance condition. Accordingly, the spacers 1151, 1152 and insulator 1153 may be formed of the similar material and have the similar structure. The terms spacers 1151, 1152 and insulator 1153 may be merely provided to distinguish them from each other, but may not be necessarily distinguished as totally different configurations by those terms.

The bracket 1160 is formed to fix the hot water tank 1130 to an inside of the body of the water purifier 1000. Referring to FIG. 4, a front surface of the first main cover 1087 and the bracket 1160 are formed with boss portions 1087a, 1087b, 1162a, and 1162b. If they correspond to each other, the positions of the two boss portions 1087a, 1087b (1162a, 1162b) may be changed according to the design, and when FIGS. 4 and 5 are compared with each other, it is seen that the positons of boss portions are changed. When a screw is inserted into the boss portion 1087a, 1087b of the main printed circuit board cover 1087 through the boss portion 1162a, 1162b of the bracket 1160, the bracket 1160 is fixed to an inner portion of the body of the water purifier 1000. The bracket 1160 is coupled to the hot water tank 1130, and thus the bracket 1160 may fix the hot water tank 1130 to an inner portion of the body of the water purifier 1000.

Referring to FIG. 5, the bracket 1160 and hot water tank 1130 are coupled to each other by interposing the spacers 1151, 1152, working coil 1140 and insulator 1153 therebetween. A plurality of boss portions 1161a, 1161b, 1161c, 1161d are formed at a position corresponding to an edge of the hot water tank 1130. The plurality of boss portions 1161a, 1161b, 1161c, 1161d are disposed to be separated from each other along a line corresponding to an edge of the hot water tank 1130. The hot water tank 1130 and bracket 1160 are coupled to each other by screws 1800a, 1800b, 1800c, 1800d inserted into the boss portions 1161a, 1161b, 1161c, 1161d.

An edge of the hot water tank 1130 is disposed between a head of each screw 1800a, 1800b, 1800c, 1800d and each boss portion 1161a, 1161b, 1161c, 1161d in a state that the hot water tank 1130 and bracket 1160 are coupled to each other by the screws 1800a, 1800b, 1800c, 1800d. Due to such a structure, the hot water tank 1130 may be coupled to the bracket 1160 without having an additional hole for screw fastening.

When the bracket 1160 and hot water tank 1130 are coupled by the screws 1800a, 1800b, 1800c, 1800d, both surfaces of the spacers 1151, 1152 are closely adhered by the hot water tank 1130 and working coil 1140. Nevertheless, the bracket 1160 and hot water tank 1130 can be coupled by the screws 1800a, 1800b, 1800c, 1800d because the spacers 1151, 1152 is allowed to maintain a gap between the hot water tank 1130 and the working coil 1140.

If a gap between the hot water tank 1130 and the working coil 1140 decreases during the process of coupling the bracket 1160 to the hot water tank 1130 by the screws 1800a, 1800b, 1800c, 1800d, then induction heating may not be accurately controlled. However, the spacers 1151, 1152 can maintain a gap between the hot water tank 1130 and the working coil 1140 with a predetermined distance, and thus the bracket 1160 and hot water tank 1130 may be coupled by the screws 1800a, 1800b, 1800c, 1800d, thereby not causing a problem in the control of induction heating.

The bracket 1160 may include a base portion 1168, and the foregoing two boss portions 1161a, 1161b, 1161c, 1161d, 1162a, 1162b are formed along an edge of the base portion 1168. A plurality of hot tank support portions 1163 are protruded from the base portion 1168 to support the hot water tank 1130. The hot tank support portions 1163 may be formed to be separated from each other along a line corresponding to an edge of the hot water tank 1130. When an edge of the hot water tank 1130 is divided into an outer side and an inner side based on a distance from the center of the hot water tank 1130, the outer side is fixed to the boss portions 1161a, 1161b, 1161c, 1161d by the screws 1800a, 1800b, 1800c, 1800d, and the inner side is supported by the hot water tank 1130.

The bracket 1160 may include a plurality of core accommodation portions 1164 disposed in a radial shape. The core accommodation portions 1164 are formed to be recessed in a direction of being away from the insulator 1153. A plurality of cores 1170 are inserted into the core accommodation portions 1164, respectively.

The core 1170 is provided to suppress a loss of current to perform the role of a shield against magnetic field lines. Ferrite may be used for the material of the core 1170 as described above.

The temperature sensor 1181 is configured to measure the temperature of liquid heated in the hot water tank 1130. A temperature sensor accommodation portion 1165 formed to accommodate the temperature sensor 1181 is formed on the bracket 1160, and the temperature sensor 1181 is inserted into the temperature sensor accommodation portion 1165. The center of the working coil 1140 having an annular shape is vacant, and thus the temperature sensor 1181 may be disposed at the center (or an inside of the annular shape) of the working coil 1140.

The temperature measured by the temperature sensor 1181 is provided to the induction heating printed circuit board 1110 and control module 1080 as illustrated in FIG. 4. The induction heating printed circuit board 1110 and control module 1080 determine whether or not to perform additional heating or suspend heating based on the temperature of the liquid measured on the temperature sensor 1181. In other words, the output of the induction heating module 1100 may be determined based on the temperature measured on the temperature sensor 1181. A thermistor may be used for the temperature sensor 1181.

The overheating protection fuse 1182 is a safety device for blocking the power of the induction heating module 1100 when liquid within the hot water tank 1130 is excessively overheated. Contrary that the temperature sensor 1181 is classified as a return sensor, the overheating protection fuse 1182 may be classified as a non-return sensor since it should be replaced once operated.

An overheating protection fuse accommodation portion 1166 formed to accommodate the overheating protection fuse 1182 is formed on the bracket 1160, and the overheating protection fuse 1182 is inserted into the overheating protection fuse accommodation portion 1166. The overheating protection fuse 1182 may be disposed at the center (or an inside of the annular shape) of the working coil 1140 similarly to the temperature sensor 1181.

The bracket 1160 may include a position fixing portion 1167. The position fixing portion 1167 may formed by protruding from the base portion 1168 along a line corresponding to an annular inner circumference of the working coil 1140 to fix the position of the working coil 1140, the spacers 1151, 1152 and the insulator to support an inner circumference thereof. A position fixing portions 1167 may be provided therein, and disposed to be separated from each other.

The position of the working coil 1140, the spacers 1151, 1152 and the insulator 1153 is fixed by the position fixing portion 1167 of the bracket 1160, and the working coil 1140, the spacers 1151, 1152 and the insulator 1153 are closely adhered to each other by the hot water tank 1130 coupled to the bracket 1160. Accordingly, the position of the working coil 1140, the spacers 1151, 1152 and the insulator 1153 may be fixed even without any additional fixing structure or sealant to maintain a gap between the hot water tank 1130 and the working coil 1140 with a predetermined distance.

Moreover, a coupling structure due to a sealant may exhibit a different operation result according to the process, and there may be difficulty in the control of induction heating according to the operation result. Accordingly, the coupling structure due to a sealant has a disadvantageous structure for mass production. However, a coupling structure due to screws 1800*a*, 1800*b*, 1800*c*, 1800*d* as disclosed in the present disclosure does not exhibit a different operation result according to the process, and has an advantageous structure for mass production.

A silicon cover 1183 is coupled to the bracket 1160 to cover the temperature sensor 1181 and the overheating protection fuse 1182. The silicon cover 1183 may be configured to surround an outer circumferential surface of the position fixing portion 1167. The silicon cover 1183 may include a hole to efficiently measure a temperature of the temperature sensor 1181.

Figure 6:
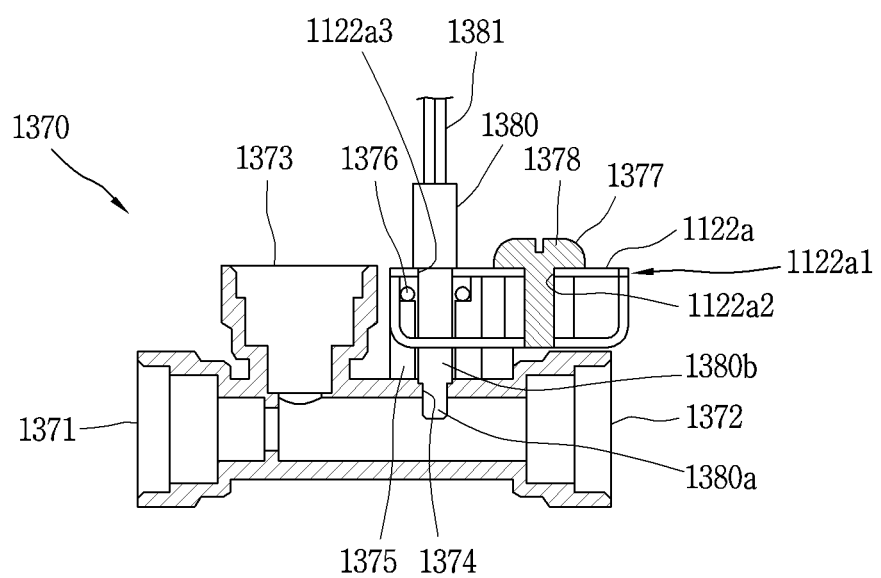
FIG. 6 is a cross-sectional view of an example connector.

FIG. 6 illustrates a cross-sectional view of an example connector 1370.

The example connector 1370 may include a hot water inlet 1371, a hot water outlet 1372 and a safety outlet 1373.

The hot water inlet 1371 is connected to the water outlet pipe 1132*b* (refer to FIG. 5) of the hot water tank 1130. Hot water generated from the hot water tank 1130 is discharged through the water outlet pipe 1132*b* of the hot water tank 1130. The hot water inlet of the connector 1370 is connected to the water outlet pipe 1132*b*, and thus hot water discharged from the hot water tank 1130 through the water outlet pipe 1132*b* is introduced into the connector 1370 through the hot water inlet 1371.

The hot water outlet 1372 is connected to the hot water outlet valve downstream side hot water line 1701. Since the downstream side hot water line 1701 is connected to the hot water outlet 1372 and water outlet portion 1020 of the connector 1370, it may be understood that the hot water outlet 1372 is connected to the water outlet portion 1020 through the downstream side hot water line 1701. The hot water outlet 1372 may be formed in a direction facing the hot water inlet 1371, but the present disclosure may not be necessarily limited to this.

The safety outlet 1373 may be formed on a passage branched from a water outlet passage between the hot water inlet 1371 and the hot water outlet 1372. The safety line 1702 is connected to the safety outlet 1373, and the safety valve 1360 is connected to the safety line 1702.

The temperature sensor 1380 is coupled to the connector 1370. The connector 1370 may include a hole 1374 formed to allow the temperature sensor 1380 to pass therethrough. An end portion of the temperature sensor 1380 is passed through the hole 1374 and exposed to hot water. A cable 1381 is connected to the temperature sensor 1380, and the cable 1381 is connected to the induction heating module 1100 or one of various printed circuit boards of the control module 1080. The temperature sensor 1380 receives power through the cable 1381.

The temperature sensor 1380 may be divided into a first portion 1380*a* and a second portion 1380*b*.

The first portion 1380*a* is formed with a smaller size than that of the hole 1374 to be inserted into the hole 1374. The circumferential surface of the first portion 1380*a* is exposed to hot water passing through the connector 1370.

The second portion 1380*b* forms a step from the first portion 1380*a*. The second portion 1380*b* is formed with a larger size than that of the hole 1374 to engage with a circumference of the hole 1374. Accordingly, when a portion stepped between the first portion 1380*a* and second portion 1380*b* is closely adhered to a circumference of the hole 1374, an end portion of the first portion 1380*a* may be accurately disposed at a design position.

The connector 1370 may include a temperature sensor support portion 1375. The temperature sensor support portion 1375 may be formed by protruding from a circumference of the hole 1374, and configured to surround the temperature sensor 1380. As illustrated in FIG. 6, the temperature sensor support portion 1375 may be formed in parallel to the safety outlet 1373, but the present disclosure may not be necessarily limited to this.

As the temperature sensor support portion 1375 supports the temperature sensor 1380, the fixing of the temperature sensor 1380 may be carried out, thereby preventing the temperature sensor 1380 from being released from the connector 1370.

The connector 1370 may include an O-ring 1376. Since the first portion 1380a of the temperature sensor 1380 is inserted into the hole 1374 of the connector 1370, hot water may be leaked through a gap existing between the first portion 1380a and a circumference of the hole 1374. The O-ring 1376 surrounds the temperature sensor 1380 to prevent hot water from being leaked between the temperature sensor 1380 and the temperature sensor support portion 1375.

The water purifier 1000 may include the connecting portion 1122a connected to the connector 1370 to fix the connector 1370. An object formed with the connecting portion 1122a may vary according to a design. Referring to FIG. 4, the connecting portion 1122a may be formed on the induction heating printed circuit board cover 1122, but the present disclosure may not be necessarily limited to this.

The connecting portion 1122a may include a base 1122a1, a first hole 1122a2 and a second hole 1122a3 formed on the base 1122a1.

The first hole 1122a2 allows a shaft of a screw 1378 fastened to the connector 1370 to pass therethrough. A head of the screw 1378 is engaged with a circumference of the first hole 1122a2.

The second hole 1122a3 may be also formed on the base 1122a1 similarly to the first hole 1122a2 to allow at least part of the temperature sensor 1380 to pass therethrough. The fixing of the temperature sensor 1380 may be carried out by a circumference of the second hole 1122a3 and the temperature sensor support portion 1375.

The foregoing water purifier is not limited to the specific implementations above, and all or part of each implementation may be selectively combined and modified.

According to the foregoing present disclosure, a connector may be installed at a position closer than a hot water outlet valve, and a temperature sensor may be coupled to the connector, thereby accurately implementing the control of induction heating using a temperature of hot water measured at the temperature sensor. The water temperature difference between the induction module and the actual measurement position may be very small, therefore the temperature sensor may provide a basis for an accurate control of induction heating.

According to the present disclosure, the actual measured temperature may be used for induction heating control instead of estimating or compensating a temperature of hot water measured at the temperature sensor.

The connector proposed by the present disclosure may prevent or otherwise limit the generation of residual water without having to be installed closer to the water outlet portion, and may be safely installed on the hot water tank. For example, a safety line may be connected to the connector to prevent a damage of the water purifier due to an overpressure.

What is claimed is:

1. A water purifier, comprising:
   a hot water tank that is configured to receive water and that is configured to heat the received water by induction heating, the hot water tank including a water outlet pipe;
   a working coil comprising a wire wound in an annular shape and configured to generate a magnetic field to thereby heat the hot water tank;
   a water outlet portion that is at least partially exposed to an outside of the water purifier and that is configured to discharge hot water that has been heated in the hot water tank;
   a connector that is directly connected to the hot water tank, the connector including:
      a hot water inlet connected to the water outlet pipe of the hot water tank and configured to receive the hot water from the hot water tank, and
      a hot water outlet configured to discharge the hot water received through the hot water inlet;
   a hot water line that connects the hot water outlet of the connector to the water outlet portion to thereby define a water outlet passage configured to guide the hot water discharged from the hot water outlet of the connector to the water outlet portion;
   a hot water outlet valve that is located at the hot water line and that is configured to open or close the hot water line based on a control command; and
   a temperature sensor that is connected to the connector and that is configured to measure a temperature of the hot water that passes through the connector,
   wherein the hot water tank comprises:
      a first cover that faces the working coil and that is configured to, in response to the magnetic field generated by the working coil, generate heat to heat the water passing through the hot water tank, and
      a second cover that is disposed at an opposite side to the working coil relative to the first cover, wherein edges of the first cover and the second cover are coupled to each other.

2. The water purifier of claim 1, wherein the connector is located nearer to the hot water tank than to the hot water outlet valve.

3. The water purifier of claim 1, wherein the connector is located between the hot water outlet valve and the hot water tank.

4. The water purifier of claim 1, wherein a distance between the connector and the water outlet pipe of the hot water tank is less than 200 mm.

5. The water purifier of claim 1, wherein the connector defines a hole that is configured to receive the temperature sensor, and an end portion of the temperature sensor is passed through the hole and exposed to the hot water.

6. The water purifier of claim 5, wherein the temperature sensor has:
   a first portion that has a first cross section that is smaller than a size of the hole, that is configured to be inserted into the hole, and that is configured to be exposed to the hot water passing through the connector; and
   a second portion that is stepped out radially from the first portion and that has a cross section that is larger than the size of the hole.

7. The water purifier of claim 6, wherein a stepped portion of the second portion contacts an upper surface of the connector around the hole.

8. The water purifier of claim 5, wherein the connector defines a temperature sensor support portion that is protruded from a circumference of the hole, and
   wherein the temperature sensor support portion is configured to receive the temperature sensor.

9. The water purifier of claim 8, wherein the connector comprises an O-ring that surrounds the temperature sensor and that is configured to restrict a leak of the hot water between the temperature sensor and the temperature sensor support portion.

10. The water purifier of claim 1, wherein the water purifier further comprises a connecting portion that is configured to receive the connector and that is configured to fix the connector to the water purifier.

11. The water purifier of claim 10, wherein the connecting portion comprises a base that defines:
a first hole that is configured to receive a screw shaft configured to fasten the connector to the connecting portion, and
a second hole that is configured to receive at least a part of the temperature sensor.

12. The water purifier of claim 1, wherein the connector comprises a safety outlet that is located between the hot water inlet and the hot water outlet.

13. The water purifier of claim 12, further comprising:
a drain that defines a drainage passage to an outside of the water purifier;
a safety line that is connected to the safety outlet and the drain; and
a safety valve that is located at the safety line and that is configured to open based on a pressure in a water passage of the water purifier increasing above a safety reference pressure.

14. The water purifier of claim 12, wherein the safety outlet is located between the temperature sensor and the hot water inlet.

15. The water purifier of claim 1, wherein the induction heating is configured to be controlled based on the temperature of the hot water measured by the temperature sensor.

16. The water purifier of claim 1, wherein the hot water inlet has a stepped portion inside the connector.

17. The water purifier of claim 1, wherein the hot water outlet has a stepped portion inside the connector.

18. A water purifier, comprising:
a hot water tank that is configured to receive a water and that is configured to heat the water by an induction heating, the hot water tank including a water outlet pipe;
a working coil comprising a wire wound in an annular shape and configured to generate a magnetic field to thereby heat the hot water tank;
a water outlet portion that is exposed to an outside of the water purifier and that is configured to discharge a hot water heated from the hot water tank;
a connector that is directly connected to the hot water tank, the connector including:
a hot water inlet connected to the water outlet pipe of the hot water tank and configured to receive the hot water from the hot water tank, and
a hot water outlet configured to discharge the hot water received through the hot water inlet;
a hot water line that connects the hot water outlet of the connector to the water outlet portion to thereby define a water outlet passage configured to guide the hot water discharged from the hot water outlet of the connector to the water outlet portion;
a hot water outlet valve that is located at the hot water line and that is configured to open or close the hot water line based on a control command; and
a safety valve that is configured to be open based on a pressure in a water passage of the water purifier increasing above a safety reference pressure,
wherein the connector further includes a safety outlet that is connected to the safety valve, and
wherein the hot water tank comprises:
a first cover that faces the working coil and that is configured to, in response to the magnetic field generated by the working coil, generate heat to heat the water passing through the hot water tank, and
a second cover that is disposed at an opposite side to the working coil relative to the first cover, wherein edges of the first cover and the second cover are coupled to each other.

19. A water purifier, comprising:
a hot water tank that is configured to receive a water and that is configured to heat the water by an induction heating, the hot water tank including a water outlet pipe;
a working coil comprising a wire wound in an annular shape and configured to generate a magnetic field to thereby heat the hot water tank;
a water outlet portion that is exposed to an outside of the water purifier and that is configured to discharge a hot water heated from the hot water tank;
a connector that is directly connected to the hot water tank, the connector including:
a hot water inlet connected to the water outlet pipe of the hot water tank and configured to receive the hot water from the hot water tank, and
a hot water outlet configured to discharge the hot water received through the hot water inlet;
a hot water line that connects the hot water outlet of the connector to the water outlet portion to thereby define a water outlet passage configured to guide the hot water discharged from the hot water outlet of the connector to the water outlet portion;
a hot water outlet valve that is located at the hot water line and that is configured to open or close the hot water line based on a control command;
a temperature sensor that is configured to measure a water temperature between the hot water tank and the water outlet portion; and
a safety valve that is configured to open based on a pressure in a water passage of the water purifier increasing above a safety reference pressure,
wherein the connector further includes:
a hole that accommodates the temperature sensor, and
a safety outlet that is connected to the safety valve, and
wherein the hot water tank comprises:
a first cover that faces the working coil and that is configured to, in response to the magnetic field generated by the working coil, generate heat to heat the water passing through the hot water tank, and
a second cover that is disposed at an opposite side to the working coil relative to the first cover, wherein edges of the first cover and the second cover are coupled to each other.

20. The water purifier of claim 18, wherein the water outlet pipe of the hot water tank is inserted into the hot water inlet of the connector.

* * * * *